(12) United States Patent
Kanazawa

(10) Patent No.: US 7,330,280 B2
(45) Date of Patent: Feb. 12, 2008

(54) IMAGE PROCESSING APPARATUS HAVING BBS FUNCTION AND CONTROL METHOD THEREOF AND PROGRAM THEREFOR, AND STORAGE MEDIUM

(75) Inventor: Toshiya Kanazawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 728 days.

(21) Appl. No.: 09/878,305

(22) Filed: Jun. 12, 2001

(65) Prior Publication Data

US 2002/0046217 A1 Apr. 18, 2002

(30) Foreign Application Priority Data

Jun. 13, 2000 (JP) ............................. 2000-176736
May 23, 2001 (JP) ............................. 2001-153866

(51) Int. Cl.
*G06F 3/12* (2006.01)
*G06F 3/14* (2006.01)

(52) U.S. Cl. .................... 358/1.13; 358/1.15; 715/748

(58) Field of Classification Search ............... 707/500; 399/8, 81, 88; 703/24; 709/217–219, 206, 709/232; 395/114, 112, 13; 358/1.15, 1.13; 715/700, 748, 752
See application file for complete search history.

(56) References Cited

U.S. PATENT DOCUMENTS

| | | | | |
|---|---|---|---|---|
| 5,390,005 A | * | 2/1995 | Kimoto et al. ................ 399/81 |
| 5,699,494 A | * | 12/1997 | Colbert et al. ............. 358/1.15 |
| 5,870,683 A | * | 2/1999 | Wells et al. ................ 455/566 |
| 6,170,007 B1 | * | 1/2001 | Venkatraman et al. ...... 709/218 |
| 6,184,996 B1 | * | 2/2001 | Gase ......................... 358/1.15 |
| 6,226,472 B1 | * | 5/2001 | Yun ............................ 399/81 |
| 6,369,905 B1 | * | 4/2002 | Mitsuhashi et al. ........ 358/1.15 |
| 6,453,127 B2 | * | 9/2002 | Wood et al. ................... 399/8 |
| 2003/0088642 A1 | * | 5/2003 | Price et al. ................. 709/218 |
| 2006/0288116 A1 | * | 12/2006 | Seki et al. .................. 709/232 |

FOREIGN PATENT DOCUMENTS

JP 2000-049996 2/2000

* cited by examiner

*Primary Examiner*—Scott A. Rogers
(74) *Attorney, Agent, or Firm*—Fitzpatrick, Cella, Harper & Scinto

(57) ABSTRACT

To provide an image processing apparatus or a scheme to set a message displayed on a terminal device externally connected to the image processing apparatus. Arbitrary messages and display timings for the messages can be set. Furthermore, troubles associated with setting of messages can be prevented beforehand.

7 Claims, 20 Drawing Sheets

OPERATION UNIT

FIG. 9

COPIER WILL BE CHECKED BETWEEN
__:__ AND __:__ ON __ (MONTH),
__ (DAY), 2___ (YEAR).

NO COPIES ARE AVAILABLE FOR THIS PERIOD. THANK YOU.

OK

NO TONER

STATUS

IMAGE PROCESSING APPARATUS HAVING BBS FUNCTION AND CONTROL METHOD THEREOF AND PROGRAM THEREFOR, AND STORAGE MEDIUM

BACKGROUND OF THE INVENTION

1. Field of the Invention

The present invention relates to, and an image processing apparatus comprising a display device capable of displaying various information as well as an image processing function, and in particular, to an image processing apparatus such as a printing apparatus which is connected to external apparatuses to executes predetermined processes and which has a display device capable of displaying various information, a control method therefor and a program for controlling this apparatus, and a computer-readable storage medium storing this program.

2. Related Background Art

Known image processing apparatuses include printing apparatuses such as composite machines provided with the functions of a copier, facsimile terminal equipment, and a printer, or these functions plus the function of a scanner or the like.

In order to make the various functions available, these printing apparatuses have an operation unit for allowing operator/users to input operations or display various information. The conventional operation section simply accepts the operation inputs from the operator/users and displays information for operational guidance and the status of the apparatus. Further, when the manager of the printing apparatus is to inform the operator/users of a failure in the image processing apparatus or scheduled maintenance, he or she must perform an operation such as sticking of a sheet with this information to the printing apparatus.

Moreover, in spite of the various functions of the printing apparatus, these functions cannot be efficiently communicated to the users. Thus, also in this case, the manager must perform an operation such as sticking of a sheet with this information to the printing apparatus.

The operation such as sticking of a sheet with information to be communicated to the users is very cumbersome to the printing apparatus manager and is thus a burden on him or her.

Further, the sheet with the message stuck to the printing apparatus may be peeled off to prevent the users from receiving the message, and it is difficult to efficiently communicate the message within a desired period.

Moreover, the manager cannot limit the use of the printing apparatus, or effectively and efficiently communicate this to the users.

Furthermore, if the manager is to make detailed settings for the message, the various settings of the image processing apparatus may not be suited for the settings for the message. Such a situation has not been expected in the prior art.

The present invention is adapted to solve these problems, and it is an object of the present invention to provide an image processing apparatus capable of effectively and efficiently communicating desired information to the users and reducing the burdens on the manager, a control method therefor and a program for controlling this apparatus, and a computer readable storage medium storing this program.

SUMMARY OF THE INVENTION

It is an object of the present invention to provide an image processing apparatus capable of effectively and efficiently communicating desired information to the users and reducing the burdens on the manager. The present invention provides an image processing apparatus having a Web server that can be accessed by external apparatuses, the image processing apparatus including: display means having different display areas; transmission means for transmitting information for a client display screen in which a message to be displayed on the display means is input, to an external apparatus of a first Web client externally connected to the image processing apparatus; and reception means for receiving first message information based on a message input by the first Web client via the client display screen displayed on the basis of the client display screen information, wherein the display means displays the message in one of the different display areas on the basis of the received first message information.

It is another object of the present information to provide a mechanism for preventing troubles associated with the manager's settings for a massage. The present invention provides an image processing apparatus including: accepting means for accepting a setting for a message displayed on a display section provided in the image processing apparatus as well as a setting for a timing for display of the message; storage means for storing a setting for a predetermined process to be executed by the image processing apparatus; determining means for determining whether or not the setting for the timing accepted by the accepting means is effective, on the basis of the predetermined process setting stored in the storage means; and means for executing, if the determining means has determined that the setting is ineffective, a process corresponding the ineffectiveness of the setting for the timing for the display of the message.

The other objectives and features of the present invention will be apparent from the following specification and drawings.

BRIEF DESCRIPTION OF THE DRAWINGS

FIG. 9 is a view showing an example of display of a message on the screen of the display device;

DETAILED DESCRIPTION OF THE PREFERRED EMBODIMENTS (First Embodiment)

Embodiments of the present invention will be described below with reference to the drawings.

In the embodiments, by way of example, a composite machine (image processing apparatus) having the functions of a copier, facsimile terminal equipment, a printer, and others will be described as a printing apparatus that is one form of an image processing apparatus. The present invention, however, is applicable to an apparatus having the single function of a copier, facsimile terminal equipment, a printer, or the like.

Image Processing Apparatus

Figure 1:
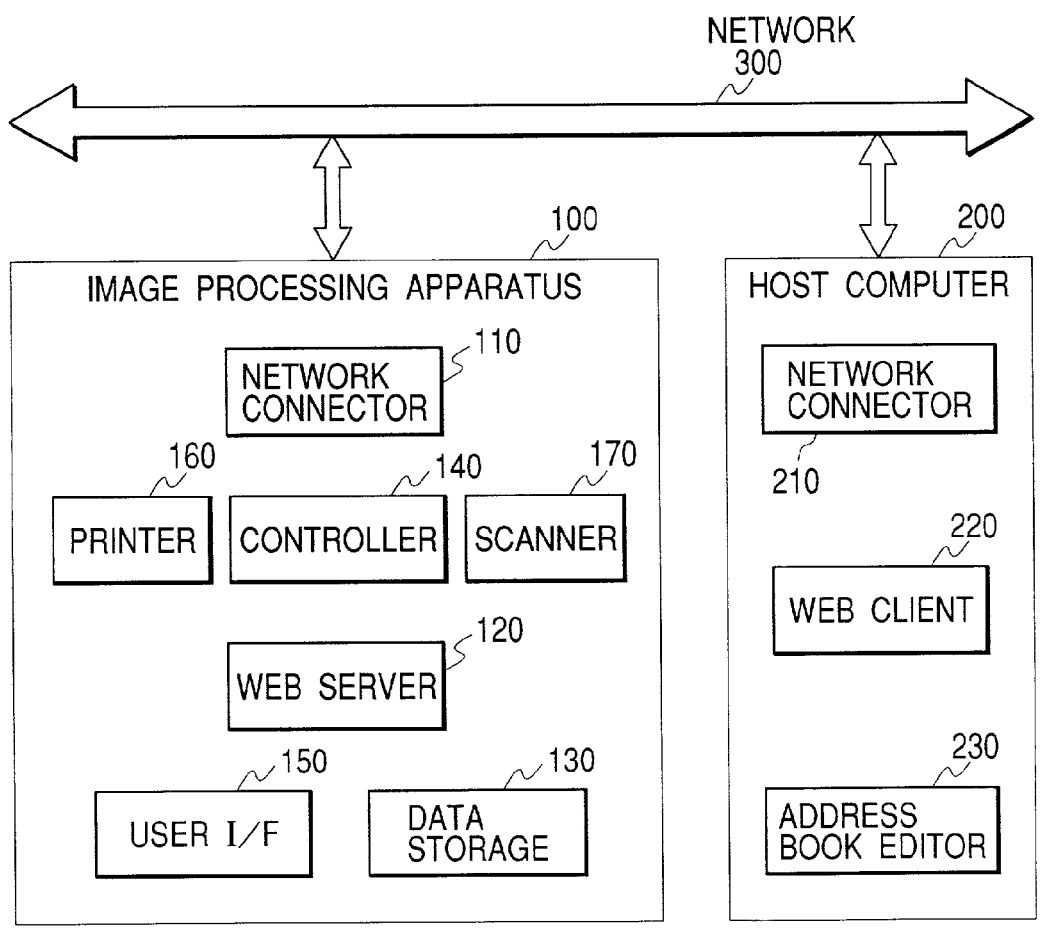
FIG. 1 is a block diagram showing an example of an image processing apparatus (printing apparatus)

FIG. 1 is a block diagram showing an example of an image processing apparatus of the present invention. In FIG. 1, an image processing apparatus 100 and a host computer 200 are connected together via a network 300. The image processing apparatus 100 comprises a network connector 110, a Web server 120, a data storage 130, a controller 140, a user interface 150, a printer 160, and a scanner 170. Further, a PC (Personal Computer) 200 comprises a network connector 210 and an address book editor 230. The Web client 220 indicates an operator of the host computer 200.

The network connector 110 is connected to the network 300 to transmit and receive data to and from the network, and provides communication functions. The Web server means 120 is capable of communications based on the HTTP (Hyper Text Transfer Protocol) and operates in accordance with the contents of the HTTP. The language processed by the Web server is not limited to the one defined in the HTTP, but the Web server can accommodate various languages in accordance with other communication protocols. The data storage 130 is a database containing addresses for image data transferred from the controller, and the user interface 150 can select from the addresses.

The controller 140 obtains image data via the scanner 150 and outputs them to the printer 160. The controller 140 can also transfer and output image data to another image output apparatus via the network connector 110 or transfer them to the server for storage in a database of the server.

Figure 20:
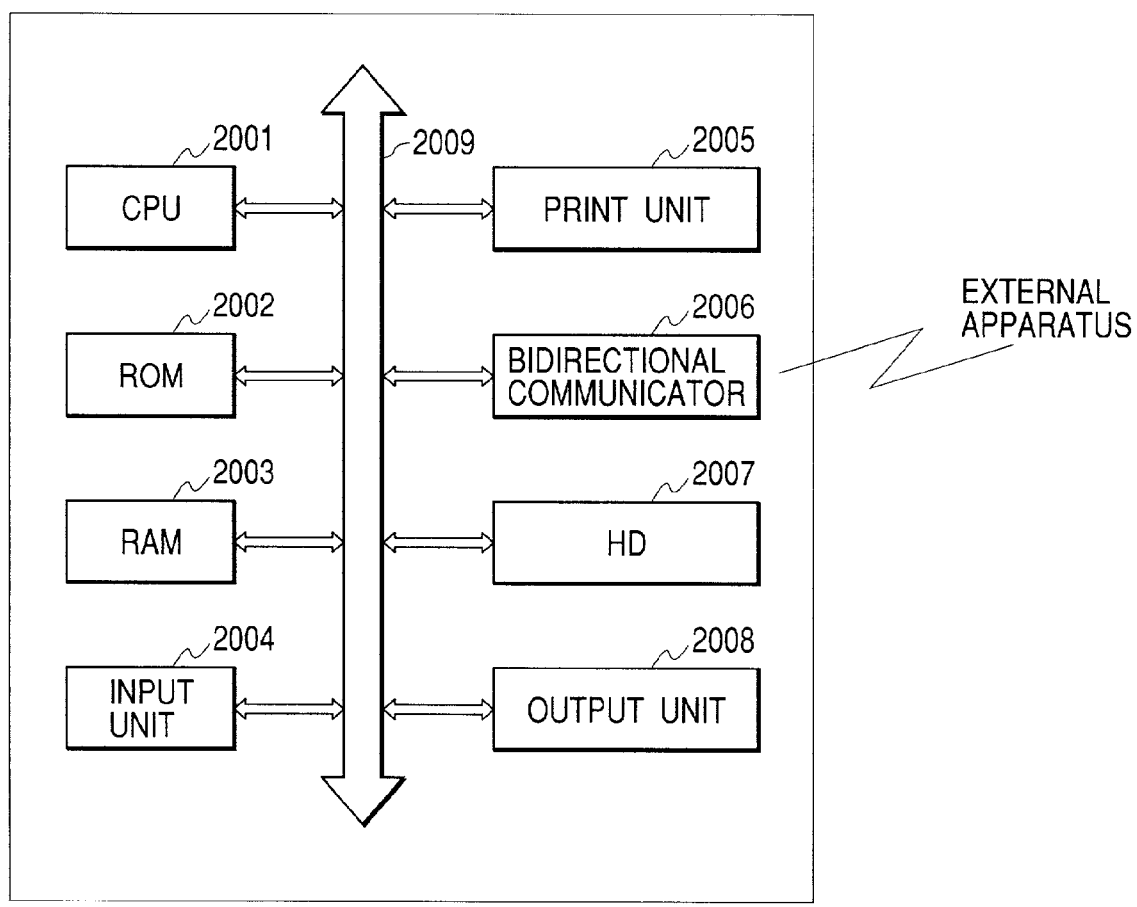
FIG. 20 is a typical view of an internal configuration of the image processing apparatus.

The configuration of hardware (a typical view of the data processing apparatus) for implementing the above described devices is schematically shown in FIG. 20. Reference numeral 2001 denotes a central processing unit for integrally controlling the devices. The CPU 2001 also has a function of carrying out the steps in the flow charts described later, by loading program codes stored in a non-volatile storage (ROM 2002) and executing processes based on the loaded program codes. The CPU 2001 integrally controls accesses to various devices connected to a system bus on the basis of control programs or the like stored in a ROM 2002 and outputs image signals as output information to a printer engine (not shown) connected thereto via a printing section 20.

Furthermore, the CPU 2001 is capable of bidirectional communications with external electronic equipment and can receive print data from external apparatuses and communicate information or the like in the image processing apparatus to external electronic equipment: the CPU realizes data transmissions and receptions. A RAM 2003 functions as a main memory, a work area, or the like for the CPU 2001.

An input unit 2004 has a function of receiving signals input by an input unit provided in the image processing main body or connected thereto via a cable, etc. An output unit 2005 has a function of displaying textual and graphic information or the like. Alternatively, a CCD device may be assumed as a loading device.

An external storage device (hard disk) 2006 is a rewritable non-volatile storage and corresponds to a hard disk (HD) storing a boot program, various applications, font data, user files, edition files, or the like. In the present invention, the external storage device particularly corresponds to a non-volatile storage storing message information.

The devices now described and shown in FIG. 20 implement the functions of each unit by operating individually or cooperating with one another shown in FIG. 1 in a practical sense. For example, in response to a control process executed by the CPU 2001 on the basis of the program code stored in the ROM 2002 (or hard disk 2007), a print unit 2005, the bidirectional communicator 2006, the hard disk 2007, and the output unit 2008 operate to implement the functions of each block.

View of Entire System

Figure 2:
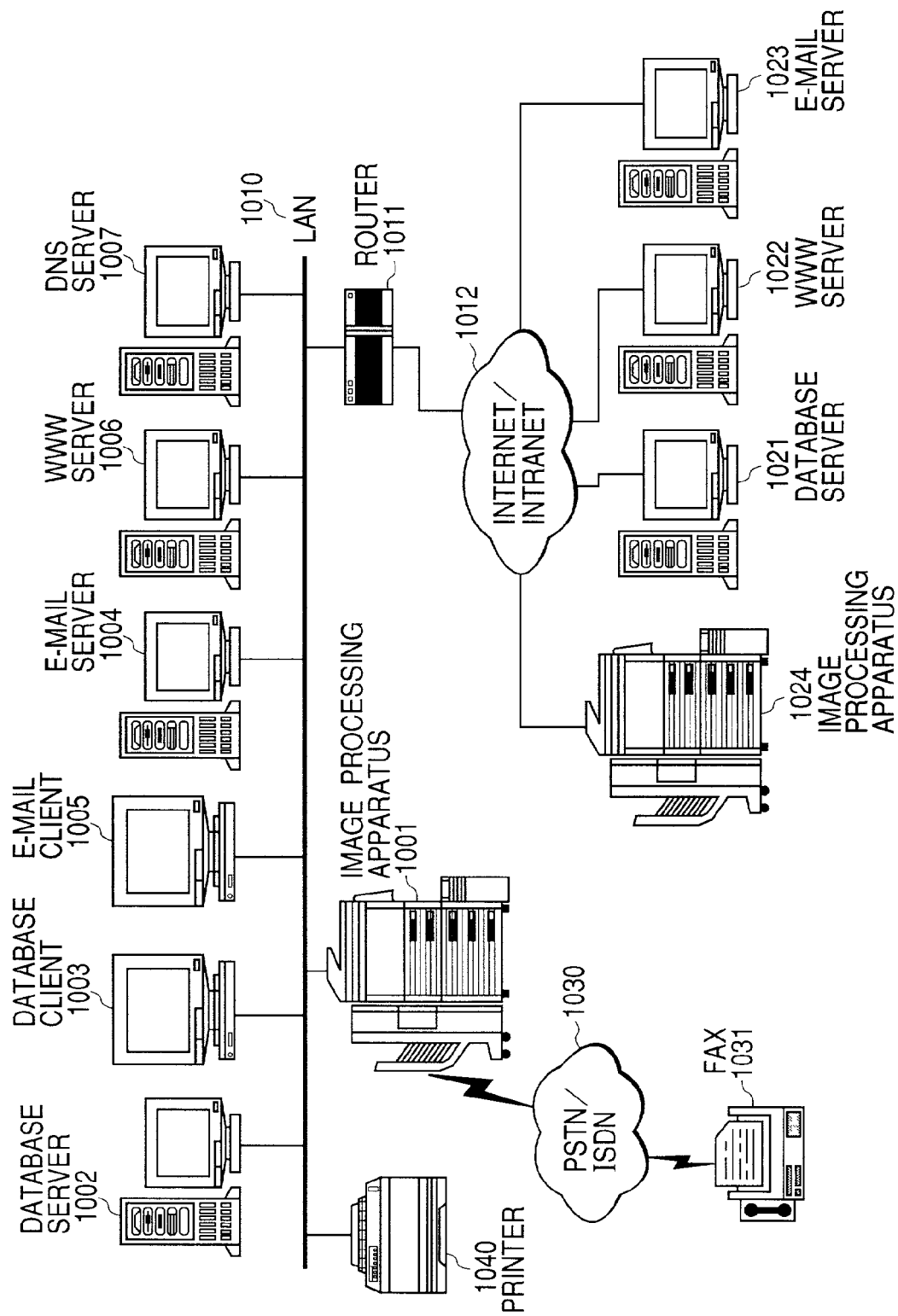
FIG. 2 is a view showing a configuration of an entire system.

FIG. 2 shows a configuration of an entire system of the present invention. Reference numeral 1001 denotes an image processing apparatus of the present invention comprising a scanner and a printer, described later, to transmit an image loaded from the scanner to a local area network 1010 (hereafter referred to as a "LAN") or print out an image received from the LAN 1010, via the printer 1040. The image processing apparatus can also transmit image data loaded from the scanner via a PSTN or ISDN 1030 using facsimile terminal equipment (not shown) and print out an image received via the PSTN or ISDN 1030, using the printer 1040. A database server 1002 manages, as a database, binary images and/or multivalued images loaded by the present apparatus 1001. Reference numeral 1003 denotes a database client of the database server 1002 for executing navigation, retrieval, or the like of image data saved to the database 1002. Reference numeral 1004 denotes an electronic mail server for receiving images loaded by the present apparatus 1001, as attachments to electronic mails. Reference numeral 1005 denotes an electronic mail client for receiving and navigating through mails received by the electronic mail server 1004 and transmitting electronic mails. Reference numeral 1006 denotes a WWW server for providing HTML documents to the LAN, and the present apparatus 1001 can print out HTML documents provided by the WWW server. Reference numeral 1007 denotes a router for connecting the LAN 1010 to the Internet/Intranet 1012. The Internet/Intranet has apparatuses similar to the above described database server 1002, WWW server 1006, electronic mail server 1004, and present apparatus 1001 connected thereto as 1021, 1022, 1023, and 1024, respectively.

On the other hand, the present apparatus 1001 can transmit and receive data to and from facsimile terminal equipment 1031 via the PSTN or ISDN 1030. Further, a printer 1040 is connected to the LAN and configured to print out images read by the present apparatus 1001.

Here, the image processing apparatus 1001, the printer 1040, the FAX, or the like can be assumed to have configurations similar to those shown in FIG. 20. Further, the database server, the electronic mail client, the electronic mail server, the WWW server, or the like have configurations similar to general data processing apparatuses, they are assumed to have the configuration of the host computer described in FIG. 1 and the configuration shown in FIG. 20 but from which the print unit is omitted.

Configuration of Entire Software Block

Figure 3:
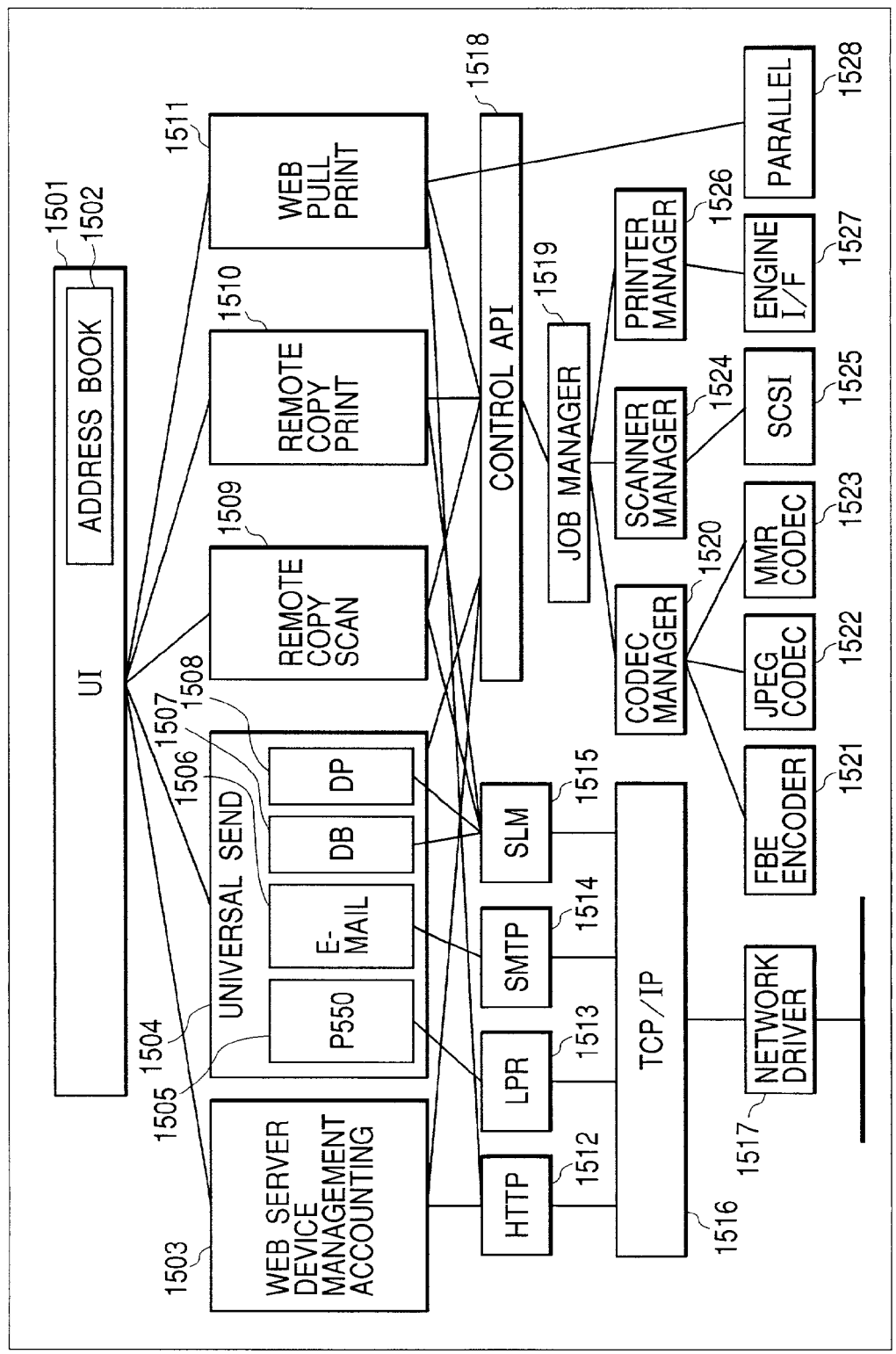
FIG. 3 is a view showing an entire organization of software for the present system.

FIG. 3 shows software block diagrams of the composite machine in which the present invention is implemented. These software functions are realized by the CPU 2001 by executing processes based on the program codes stored in the ROM 2002 or the hard disk 2007.

Reference numeral 1501 denotes a user interface (hereafter referred to as a "UI") that is a module for mediating between the operator and the equipment when the operator performs various operations or settings for the image processing apparatus (present composite machine). In accordance with the operator's operations, the present module transfers input information to various modules, described later, and performs operations such as a request for a process and data setting.

Reference numeral 1502 denotes a database module for managing an Address Book, that is, data destinations, receiving sides, or the like. Data is added to, deleted from, or obtained from the address book in accordance with an operation from the UI 1501; the address book is used to provide data destination and receiving side information with the modules described later, in accordance with the operator's operation.

Reference numeral 1503 denotes a Web server module that is used to communicate management information on the present composite machine in response to a request from a Web client (not shown). The management information is loaded via Control API 1518, described later, and communicated to the Web client via an HTTP 1512, a TCP/IP 1516, and a Network Driver 1517, described later.

Reference numeral 1504 denotes Universal Send that is a module for distributing data, that is, distributing data specified by the operator via the UI 1501 to similarly specified destinations. Further, if the operator specifies generation of distributed data using the scanner function of the present equipment, the equipment is operated via the Control API 1518, described later, to generate data.

Reference numeral 1505 denotes a module executed when the printer is designated in the Universal Send 1504 as a destination.

Reference numeral 1506 denotes a module executed when an E mail address is designated in the Universal Send 1504 as a destination.

Reference numeral 1507 denotes a module executed when the database is designated in the Universal Send 1504 as a destination.

Reference numeral 1508 denotes a module executed when a composite machine similar to the present equipment is designated in the Universal Send 1504 as a destination.

Reference numeral 1509 denotes a Remote Copy Scan module that uses the scanner function of the present composite machine to execute a process similar to the Copy function provided by the present composite machine, by setting, as a destination, another composite machine connected to the present composite machine via the network or the like.

Reference numeral 1510 denotes a Remote Copy Print module that uses the scanner function of the present composite machine to execute a process similar to the copy function provided by the present composite machine, by setting, as a source, another composite machine connected to the present composite machine via the network or the like.

Reference numeral 1511 denotes a Web Pull Print module that reads out and prints information from various home pages in the Internet or Intranet.

Reference numeral 1512 is a module used when the present composite machine communicates on the basis of the HTTP, to provide communications for the above described Web Server 1503 and Web Pull Print module 1511, via a TCP/IP module 1516, described later.

Reference numeral 1513 denotes an Ipr module that provides communications for the printer module 1505 in the above described Universal Send 1504, via the TCP/IP 1516 module, described later.

Reference numeral 1514 denotes an SMTP module that provides communications for the E mail module 1506 in the above described Universal Send 1504, via the TCP/IP 1516 module, described later.

Reference numeral 1515 denotes an SLM, that is, Salutation Manager module that provides communications for the database module 1507 and DP module 1508 in the above described Universal Send 1504, as well as the Remote Copy Scan module 1509 and the Remote Copy Print module 1510, via the TCP/IP 1516 module, described later.

Reference numeral 1516 denotes a TCP/IP communication module that provides network communications for the above described various modules via a Network Driver, described later.

Reference numeral 1517 denotes a network driver that controls components physically connected to the network.

Reference numeral 1518 denotes a Control API that provides an interface between the upstream modules such as the Universal Send 1504 and the downstream modules such as a Job Manager 1519, described later, to reduce the dependency between the upstream and downstream modules to thereby allow these modules to operate more flexibly.

Reference numeral 1519 denotes a Job Manager that interprets processes specified by the above described various modules via the Control API 1518 and gives instructions to the respective modules described later. This module solely manages hardware processes executed in the present composite machine.

Reference numeral 1520 denotes a CODEC Manager that manages and controls particular ones of the processes specified by the Job Manager 1519, that is, various data compression and decompression processes.

Reference numeral 1521 denotes an FBE Encoder that compresses data loaded through a scan process executed by the Job Manager 1519 and the Scan Manager 1524, into an FBE format.

Reference numeral 1522 denotes a JPEG CODEC that executes a JPEG compression process on loaded data and a JPEG decompression process on print data during a scan process executed by the Job Manager 1519 and the Scan Manager 1524 and during a print process executed by the print manager 1526.

Reference numeral 1523 denotes an MMR CODEC that executes an MMR compression process on loaded data and an MMR decompression process on print data during a scan process executed by the Job Manager 1519 and the Scan Manager 1524 and during a print process executed by the Print Manager 1526.

Reference numeral 1524 denotes a Scan Manager that manages and controls a scan process specified by the Job Manager 1519.

Reference numeral 1525 denotes a SCSI driver that enables communications between the Scan Manager 1524 and the scanner to which the present composite machine is internally connected.

Reference numeral 1526 denotes a Print Manager that manages and controls a print process specified by the Job Manager 1519.

Reference numeral 1527 denotes an Engine I/F driver that provides an interface between the Print Manager 1526 and the print unit.

Reference numeral 1528 denotes a parallel port driver that provides an interface used when the Web Pull Print module 1511 outputs data to output equipment (not shown) via a parallel port.

User Interface Application

The Address Book 1502 will be described. The Address Book is saved to the non-volatile storage device (non-volatile memory or hard disk) in the present equipment, and has the characteristics of the other apparatuses connected to the network described therein.

For example, the address book contains the following:
Formal and alias names of the apparatus
Network address of the apparatus
Network protocol that can be processed by the apparatus
Document format that can be processed by the apparatus
Compression type that can be processed by the apparatus
Image resolution that can be processed by the apparatus
Information on available sheet sizes and feeding stages for a printer
Names of folders in which documents can be stored, for a server (computer)

The applications described below can determine the characteristics of a destination on the basis of the information described in the aforementioned Address Book 1502.

Remote Copy Application

A remote copy application determines a resolution that can be processed by an apparatus specified as a destination, on the basis of the Address Book 1502, compresses a binary image loaded by the scanner in accordance with the resolution using the well-known MMR compression, converts the compressed image into the well-known TIFF (Tagged Image File Format), and then transmits the file to the printer on the network through the SLM. Although not described in detail, the SLM is a kind of network protocol including well-known apparatus control information called the "Salutation Manager" (or smart link manager).

Summary of Operation Unit

Figure 4:
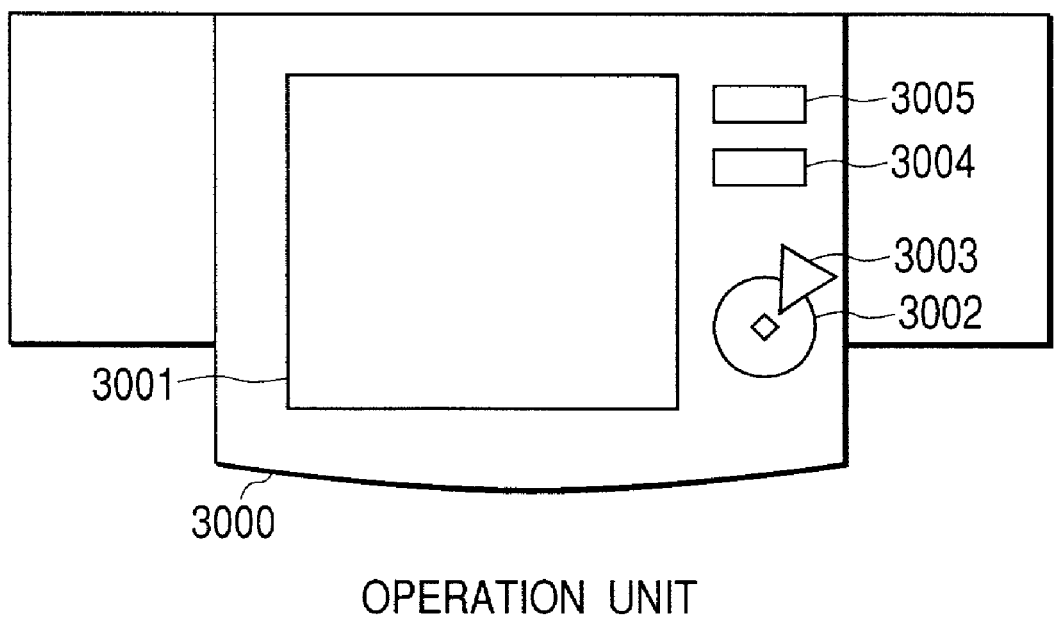
FIG. 4 is a view showing an example of an entire operation unit.

FIG. 4 shows an entire configuration of an operation unit. An LCD display unit (3001) comprises a touch panel sheet stuck to an LCD to display a system operation screen. When one of the displayed keys is depressed, the LCD display unit (3001) communicates corresponding positional information to a controller CPU (central processing unit) provided in the apparatus. A start key (3002) is used to start an operation of reading an image from an original or in other cases. The start key has a two-color (green and red) LED in the center thereof to indicate whether or not the start key is available, depending on the color of the LED. A stop key (3003) serves to stop an operation in progress. An ID key (3004) is used to input a user ID. A reset key (3005) is used to initialize settings from the operation unit.

The menus displayed on the operation unit will be described below in detail.

Operation Menu

Figure 5:
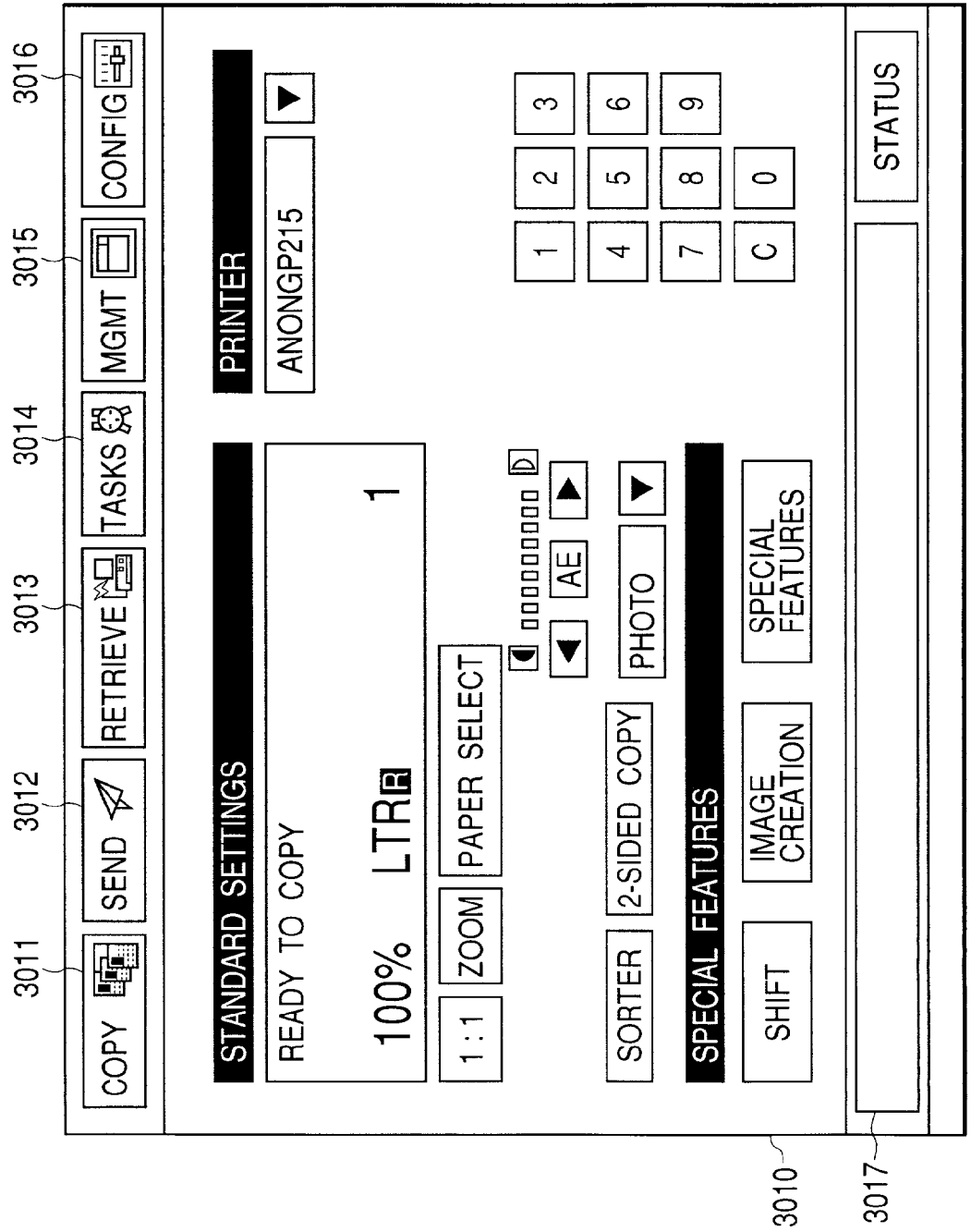
FIG. 5 is a view showing an example of a screen displayed on the operation unit.

An operation menu is shown in FIG. 5. The functions provided by the apparatus of this embodiment are roughly classified into six major categories including Copy, Send, Retrieve, Tasks, Management, and Configuration, which correspond to six main tabs (COPY/SEND/RETRIEVE/TASKS/MGMT/CONFIG) (3011-3016) displayed in a tab display unit at the top of the operation menu (3010). Pressing any of the main tabs switches the display to the screen of the corresponding category. If switching to the different category is not permitted, that main tab has its display color changed and does not respond to the depression.

The Copy function includes a function of normally copying a document using the local scanner and printer and a function of copying a document using the scanner of the local apparatus and a printer connected thereto via the network (remote copy).

The Send function transfers document placed on the local scanner to the electronic mail, a remote printer, FAX, or the file transfer protocol (FTP), and the database and enables a plurality of destinations to be designated.

The Retrieve function obtains an external document and prints it using the local printer. The document can be obtained via the WWW, an electronic mail, a file transfer, or FAX.

The Tasks function automatically processes a document transmitted from an external source via FAX or Internet print, and generates and manages tasks of executing periodic Retrievals.

The Management function manages information on jobs, the address book, book marks, documents, and accounts.

The Configuration function provides settings (network, clock, or the like) for the local apparatus.

A status area (3017) displays the status of the apparatus (no sheet in the printer, no toner, or the like) and statuses of the functions (copy, transmission, and reception operation) provided by the apparatus. Further, a main area is provided between the tab display unit located at the top of the operation menu (3010) and the status area (3017), and displays a main operation menu. The main area displays an operation menu (operation panel screen) for the copy and FAX functions, the printer, the scanner, or the like. Thus, the areas of the operation menus of the apparatus in this embodiment are assigned with the corresponding functions.

Next, an example of a screen displayed on a terminal device of a Web client externally connected to the present apparatus. The screen described below is provided by the Web server 120.

Figure 13:
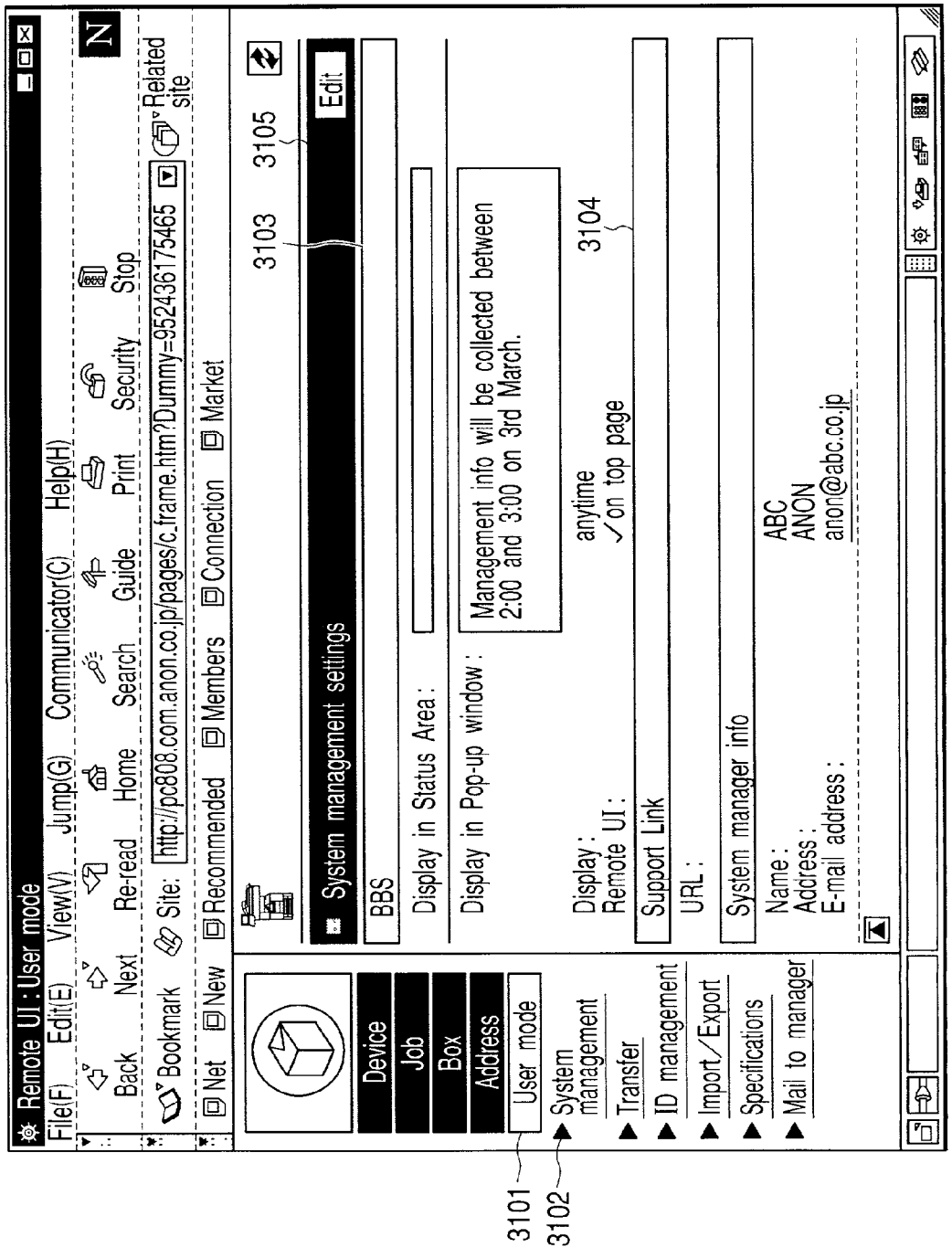
FIG. 13 is a view showing an example of a screen for system management settings for a Web client.

FIG. 13 shows a system management setting menu of the Web client. The apparatus manager (Web client) uses this setting menu to manage the system.

When a user mode (3101) at the left side and a system management (3102) selection buttons are selected, the currently registered BBS (3103), support link URL (3104), system management setting edition button (3105) are displayed. In registering new contents or modifying registered contents, the edition button (3105) can be selected to edit system management settings.

Figure 14:
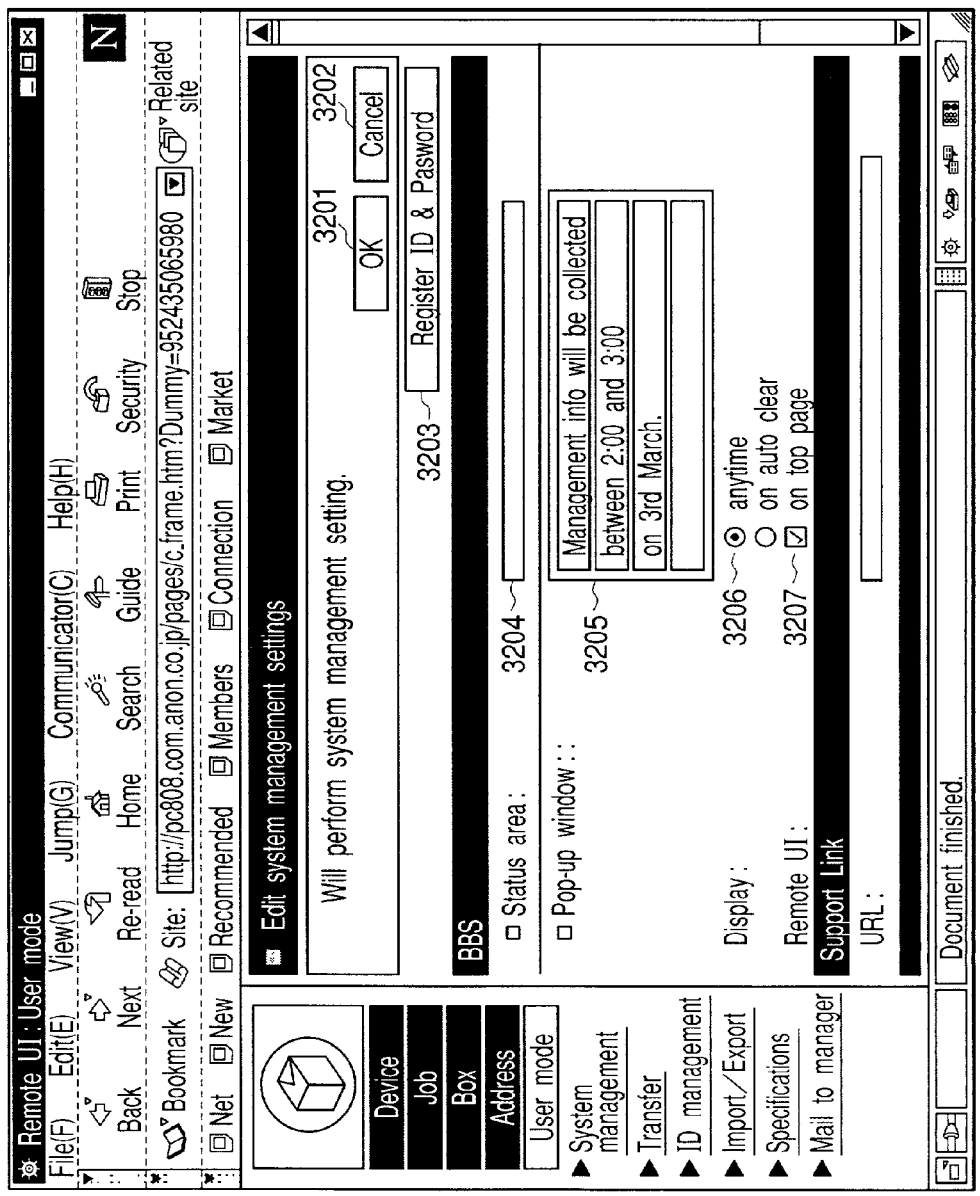
FIG. 14 is a view showing an example of an edition screen for system management settings for a Web client (apparatus manager)

FIG. 14 shows an edition menu for system management settings which is displayed by selecting the edition button (3105) in FIG. 13.

An OK (3201) and a cancel (3202) buttons select registration or cancellation of edited contents, respectively. A register ID and password button (3203) selects inputting of an ID and a password, and has IDs and passwords registered to limit edition users.

A status message area (3204) is an area in which a message indicating that the status area (3017) shown in FIG. 5 is used as a BBS is registered. A popup window message area (3205) is an area in which a message to be displayed on the operation display unit as a BBS in a popup window form is registered. The BBS in the popup window form is selected using a display method selection button (3206). The popup window may cover the entire operation menu (3010) or only the areas different from the status area (3017) and/or tab area (information in the operation menu 3010) of the operation menu (3010). That is, the popup window can be assumed to cover a large portion of the entire area of the operation menu.

Reference numeral 3207 denotes a selection button for determining whether or not settings for the BBS are displayed on a top page of the Web client. In FIG. 14, a section "Display on Top Page" is checked, so that the message corresponding to the input to the popup window message area (3205) is displayed on the top page of the display screen of the Web client (this corresponds to FIG. 15, described later).

On the other hand, if the settings are not set to be displayed, that is, "Display on Top Page" is not selected in the check box 3207 of the remote UI in FIG. 14, a message display 3302 in FIG. 15, described later, is not displayed on the top page.

Further, the top page as used herein refers to the first display menu displayed when a browser is activated, and corresponds to, for example, a display based on display screen information identified by an IP address excluding file identification information.

The data input to the screen of the terminal apparatus of the Web client (apparatus manager) as described above is transmitted to the present apparatus via the network connectors 110 and 210. The present apparatus received this data and the data storage (120) stores it. Further, when the Web client accesses the Web server 120, an image based on the saved data is provided by the Web server 120 to the Web client via both of the network connectors 110 and 210.

As described above, the manager can set a message displayed on the display unit of the image processing apparatus or on the display unit of the Web client via the setting menu shown in FIG. 14, thereby reducing the burdens on the manager as conventionally imposed when a medium such as a sheet with the message must be stuck to the apparatus.

Further, the setting section 3207 can set whether or not the Web client (terminal device) is allowed to navigate through message information via the browser. For example, for an important message desirably communicated to all users, the section (3207) can be checked so that the Web client can navigate through the information to urge all the users to pay attention to the message.

The menus displayed on the Web client will be described below.

Figure 15:
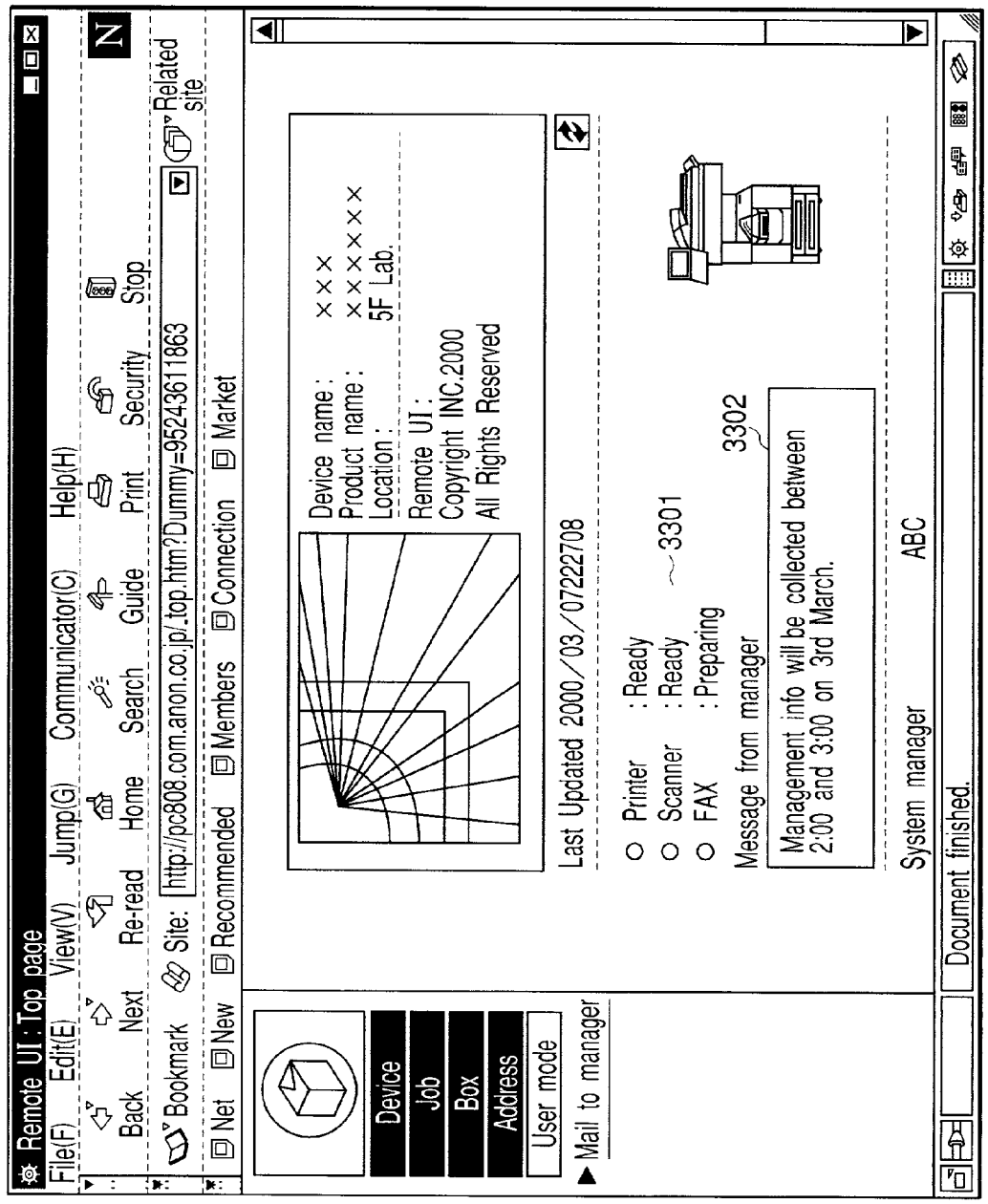
FIG. 15 is a view showing an example of a top page screen for the Web client.

FIG. 15 is a top page menu displayed on the screen of the Web client (terminal device).

Reference numeral 3301 denotes the statuses of the printer, the scanner, and the facsimile terminal equipment. This information is created on the basis of the status information on the present apparatus at the time of the access of the Web client to the Web server 120.

Figure 16:
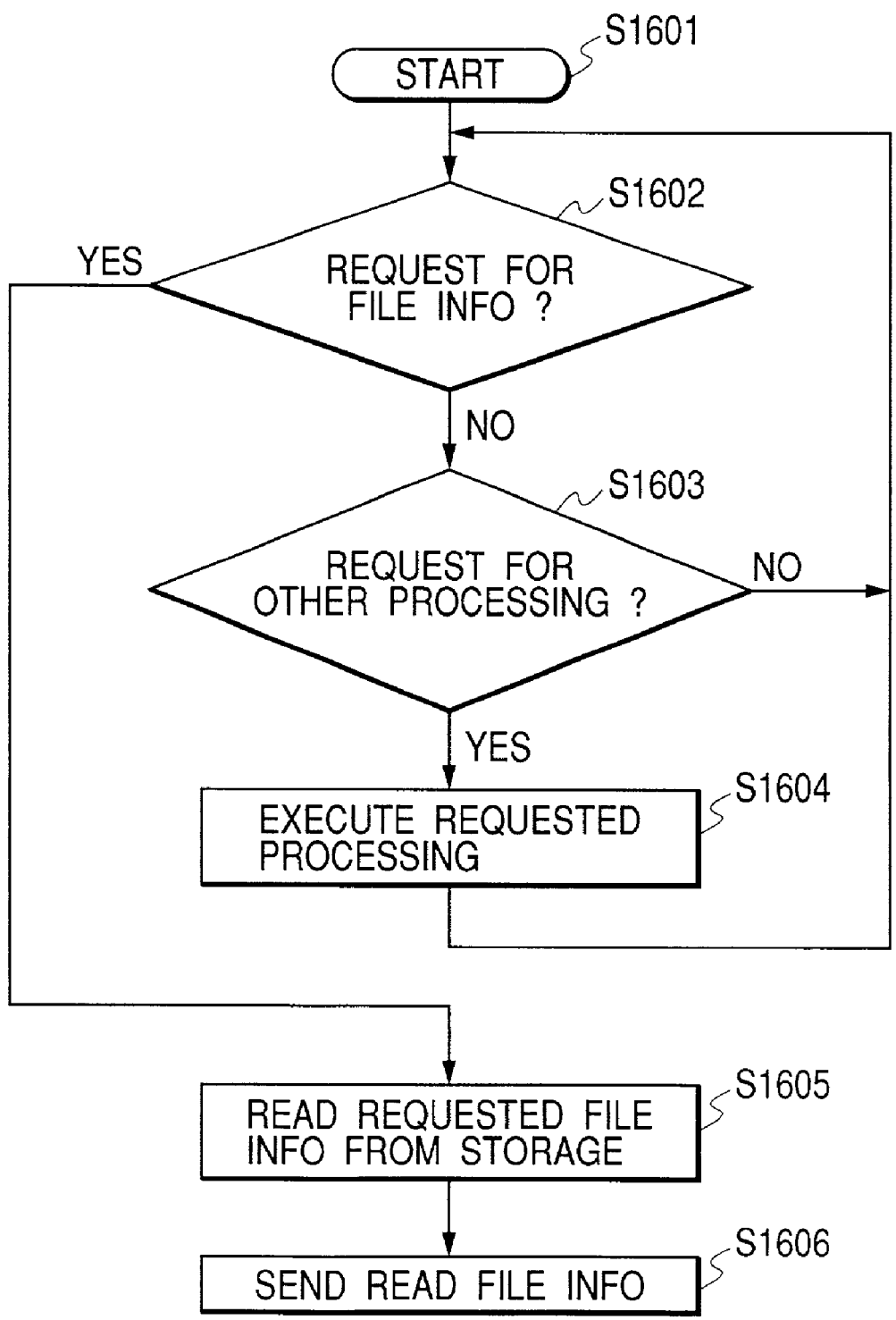
FIG. 16 is a flow chart showing a process executed by the image processing apparatus.

The manager message (3302) is displayed on the apparatus as the BBS and has been input to the popup window message area (3205) of the system management setting edition menu in FIG. 14. This allows a plurality of Web clients other than the manager to view the management status of the composite machine on their terminal device screens, thus reducing the burdens on the manger and enabling the users to easily obtain the management information. A process executed by the Web server when a message is displayed on the client computer will be described below with reference to FIG. 16. In this figure, the CPU 2001 provided in the apparatus main body loads a program code stored in the non-volatile storage means (corresponding to the ROM 2002, the hard disk 2007, or the like) and executes a process based on the loaded program code.

First, at step S1601, the process is started. At step S1602, it is determined whether or not a request for file information stored in the apparatus main body has been received from an external apparatus with which the present apparatus can communicate via the network. The network corresponds to the network 300 in FIG. 1 or the local area network 1010 or Internet/Intranet in FIG. 2.

Then, at step S1603, it is determined whether or not a request such as a print request which relates to another process has been issued by an external apparatus. If it is determined that such a request has been issued, this process is executed at step S1604, and the step S1602 is executed again.

On the other hand, if, at step S1602, it is determined that a request for file information has been issued by an external apparatus, then at step S1605, the request file information is identified and this information, stored in the storage unit, is then loaded. In this case, the storage unit may be provided inside the apparatus main body or connected thereto via a communication line. Further, in the present invention, the file stored in the storage unit and requested by an external apparatus is set, for example, via the system management setting edition menu described above in FIG. 14, and corresponds to one stored in the data storage (130); it also corresponds to information required to generate a screen displayed on the display unit of the Web client (terminal device), for example, as shown in FIG. 15.

With reference to the flow charts shown in FIGS. 6, 10, 11, and 12, a description will be given of how the Web client communicates with the Web server and transmits BBS display message data to the present apparatus and how the data is then displayed on the apparatus. The flow charts shown in FIGS. 6, 10, 11, and 12 show processes implemented by the CPU (central processing unit) provided in the composite machine (present apparatus), on the basis of the program codes stored in the storage unit provided in the composite machine (present apparatus).

Figure 6:
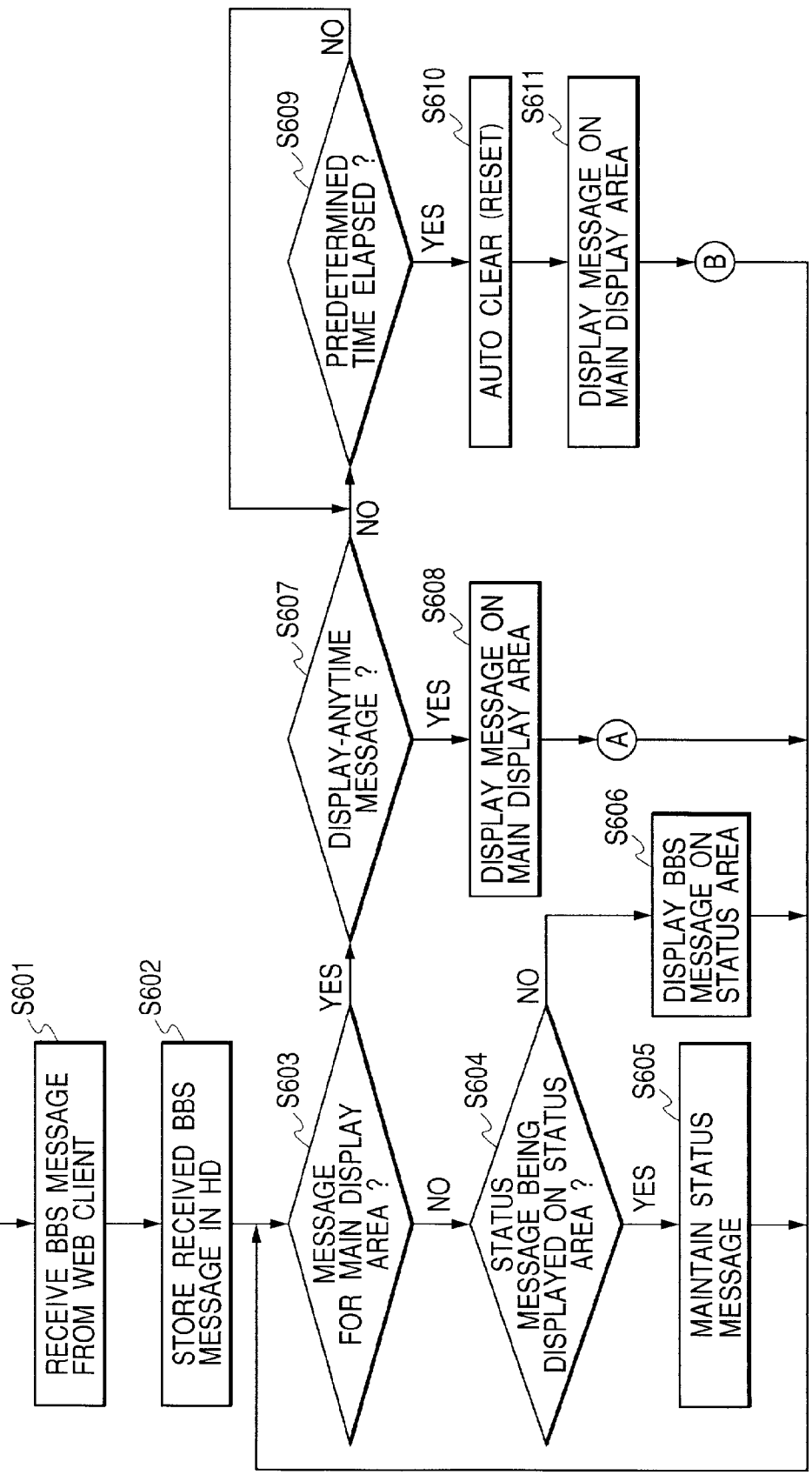
FIG. 6 is a flow chart showing a sequence of steps for displaying a message on a screen of a display device.

FIG. 6 is a flow chart showing a sequence of operations. At step S601, the Web client communicates with the Web server to receive BBS display message transmitted to the present apparatus. At step S602, the received data (message) is saved to the data storage (130) in FIG. 2, for example, a hard disk.

Figure 7:
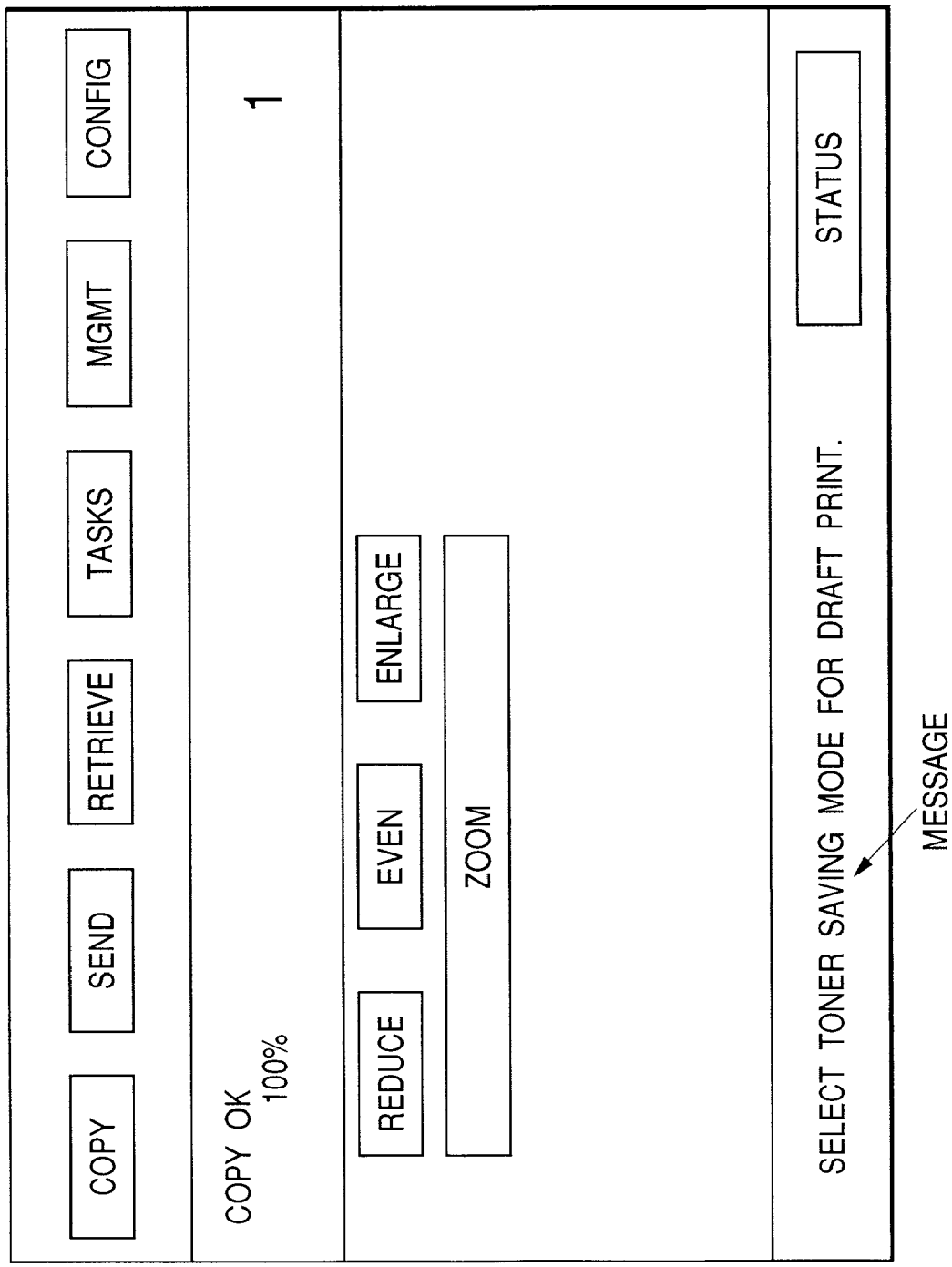
FIG. 7 is a view showing an example of display of a message on the screen of the display device.
Figure 12:
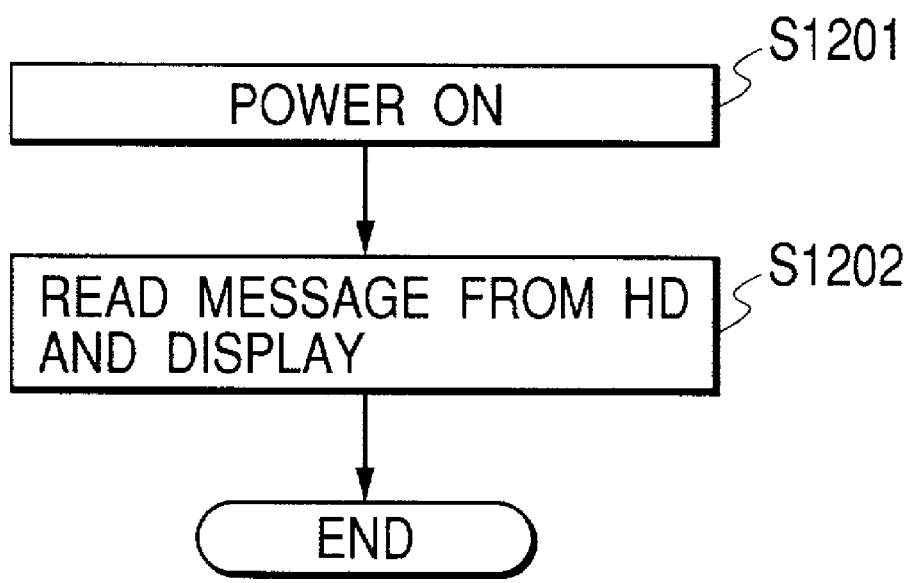
FIG. 12 is a flow chart showing a message display process executed when a power supply to the image processing apparatus (printing apparatus) is activated.

Then, the data transmitted after being set in the system management setting edition menu (4200) of the Web client in FIG. 14 is received, and at step S603, it is determined whether or not the screen designated in the data as one on which the message is to be displayed is a main display area. If the data is not to be displayed on the entire main menu, then it is determined at step S604 whether or not the status area (3017) is displaying a status message for the status of the apparatus (no sheet in the printer, no toner, or the like) and the status of the function provided by the apparatus (copy, transmission, or reception operation, or the like). If it is determined that the status message is being displayed, the display of the status message is maintained at step S605, and the process waits for display of the received message to be enabled. If the display is enabled (the status message is not being displayed), then at step S606, the received message is displayed as shown in FIG. 7. This message remains displayed until a deletion command arrives or a message of a higher priority for the status of the apparatus (no sheet in the printer, no toner, or the like) or the status of the function provided by the apparatus (copy, transmission, or reception operation, or the like) is displayed. Further, since the message is saved to the hard disk as described above, it remains saved even after the power supply has been turned off and is displayed again when the power supply is turned on again. FIG. 12 shows a flow chart. When the power supply to the apparatus is turned on (S1201), the contents of and the conditions for the message saved to the hard disk are read out to display the message (S1202).

If it is determined at step S603 that the message is displayed in the main display area, then it is determined at step S607 whether or not it is to be immediately displayed, that is, to be always displayed. If it is determined that the message is to be always displayed, then at step S608, it is displayed in the main display area. A subsequent process A will be described. As shown in the flow chart in FIG. 10, the process of always displaying the message is deleted (step S1002) if the always displayed information is cancelled or an instruction is given to delete the display of the message (step S1001). The information concerning the deletion is created by manipulating the display method selection button (3206) and popup window message area (3205) in FIG. 14. On the other hand, if the always displayed state is maintained, the operation menu of the apparatus is not displayed, thus limiting the use of the apparatus by users. Moreover, if the operation menu is displayed again in the main display area at step S1003, the flow chart shown in FIG. 6 is terminated.

Figure 8:
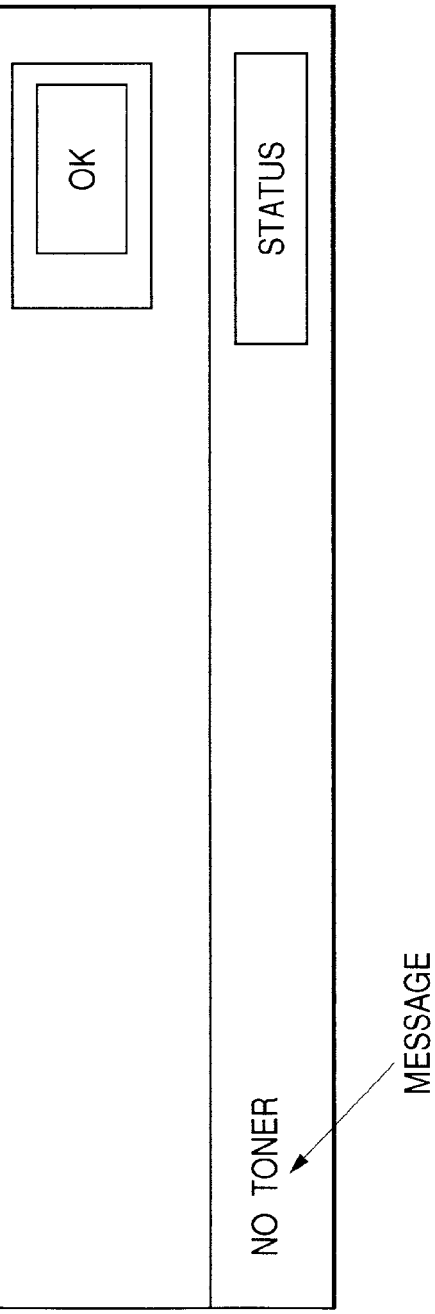
FIG. 8 is a view showing an example of display of a message on the screen of the display device.
Figure 10:
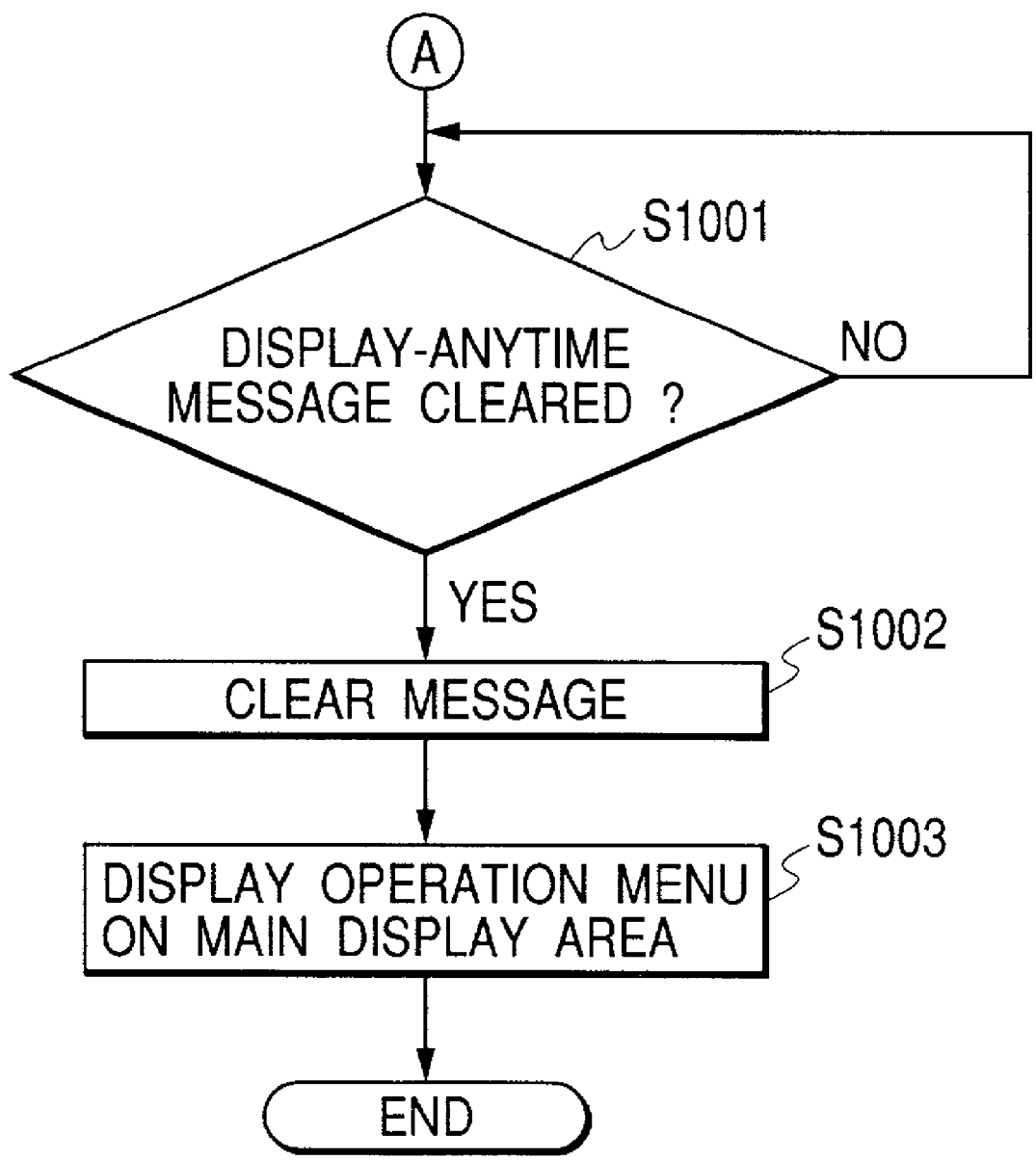
FIG. 10 is a flow chart showing a sequence of steps for displaying a message on the screen of the display device.
Figure 11:
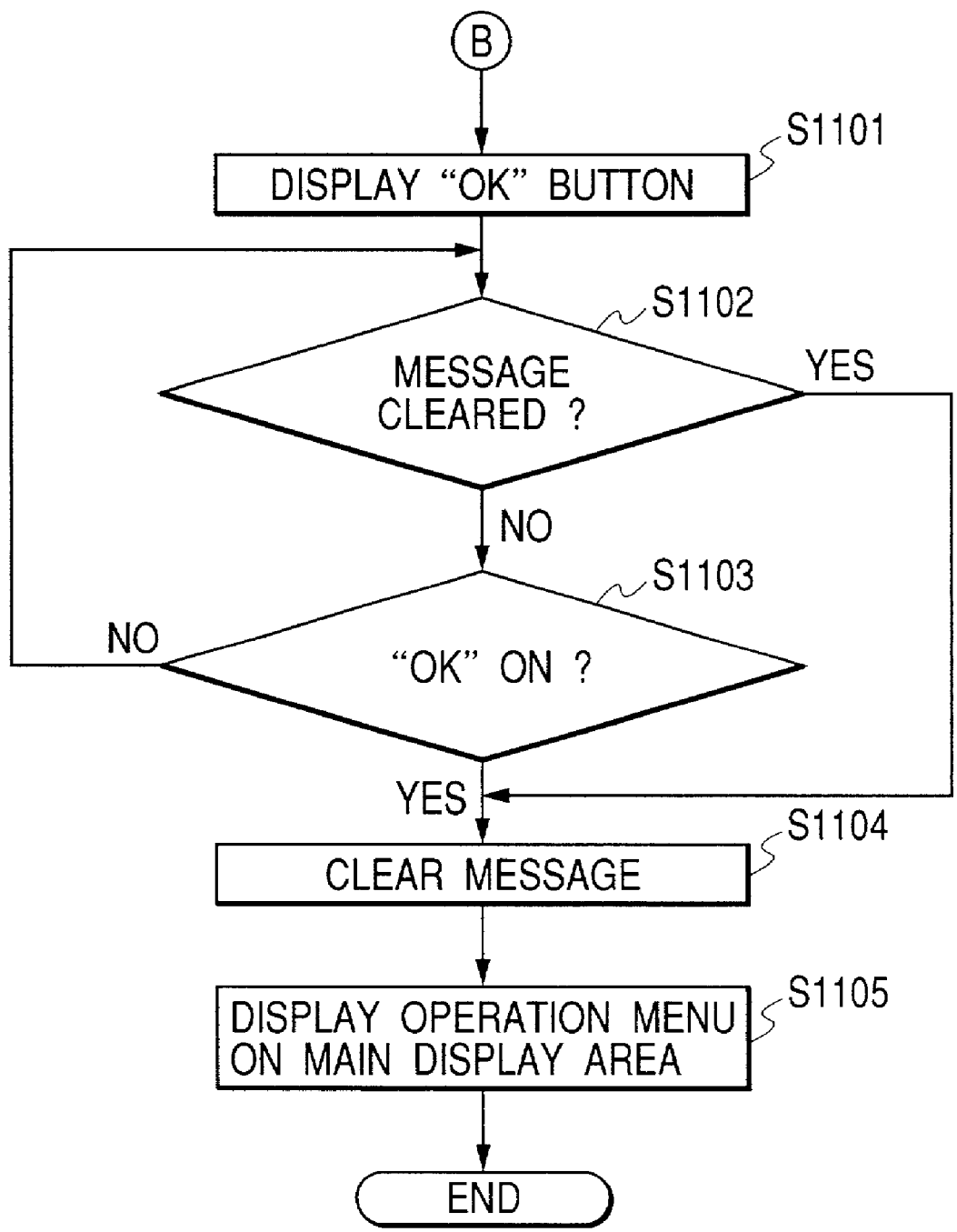
FIG. 11 is a flow chart showing a sequence of steps for displaying a message on the screen of the display device.

On the other hand, if the message is not to be always displayed, then at step S609, a timer is set to wait for a designated duration until the display is enabled. The timer in this embodiment has an auto clear function (that resets the operation menu after it has not been manipulated for a fixed period of time). Once a predetermined period of time has passed at step S610, a message such as one shown in FIG. 8 is displayed on a copy screen at step S611. A subsequent process B will be described. As shown in the flow chart in FIG. 11, this message remains displayed (step S1101 or S1104) until a user specifies that the messages is deleted (the OK key is depressed (step S1103) or the display of the message is cancelled (step S1102). If the deletion is specified, the steps S603, S607, and S609 are executed again, and after a designated period of time, a message such as the one shown in FIG. 8 is displayed again. Additionally, the message and the message display conditions are as descried above. Since the message is saved to the hard disk, it remains saved even after the power supply has been turned off, and displays the same contents under the same conditions when the power supply is turned on again. FIG. 12 shows a flow chart of a power turn-on process.

(Second Embodiment)

In a second embodiment, in the setting menu in FIG. 14 described in the first embodiment, the message information input to the message area 3204 can be set to be displayed, in different manners, on the display unit of the image processing apparatus and on the display unit of the Web client (terminal device) that can communicate with the image processing apparatus via the communication line. Specifically, as described above, it is possible to set the display on the display unit of the image processing apparatus in different manners including "anytime display" and "display upon auto clear" and to set whether or not to display the settings for the BBS on the top page of the display menu of the browser when the remote UI, that is, the Web client navigates through message information such as that displayed on the display unit of the image processing apparatus.

In the second embodiment, a scheme will be described which enables a message to be further efficiently transmitted to the Web client when the client navigates through message information displayed on the display unit of the image processing apparatus.

Figure 17:
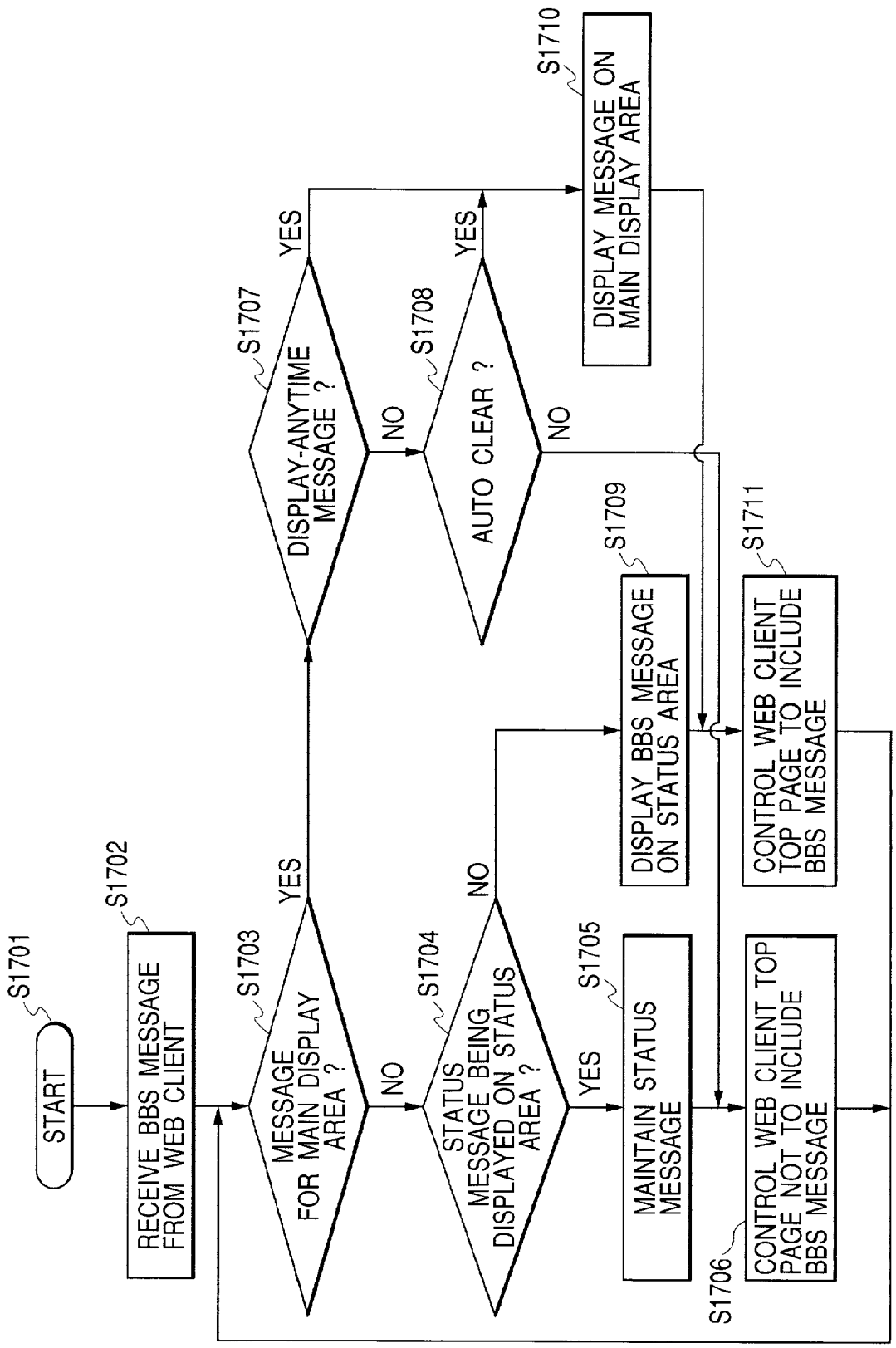
FIG. 17 is a flow chart showing a process executed by the image processing apparatus to display a message.

The operation of the image processing apparatus in the second embodiment will be described with reference to FIG. 17. The steps shown in the flow chart in FIG. 17 are carried out by the CPU (corresponding to the CPU in the drawings) provided in the apparatus, by loading program codes stored in the non-volatile storage (corresponding to the ROM or HDD in the drawings) and executing processes based on the loaded program codes.

First, the process is started at step S1701.

Then, at step S1702, message information is received which has been input via the manager setting menus 3204 and 3205 described in FIG. 14 for the first embodiment.

At step S1703, it is determined what kind of message the one received at step S1702 is. That is, at step S1703, it is determined whether the message in the received message information is to be displayed in the status area (the message has been input via the area 3204 in FIG. 14) or in the main display area (the message has been input via the area 3205 in FIG. 14).

If it is determined at step S1703 that the message is not set to be displayed in the main display area, that is, it is set to be displayed in the status area (the area in FIG. 7 in which the message "Select Toner Saving Mode For Draft Print" is displayed), then at step S1704, it is determined whether any status message (corresponding to, for example, the message "No Toner" in FIG. 8) is being displayed in the status area. If it is determined that a message is being displayed in the status area, the process shifts to step S1705. If it is determined that no message is being displayed in the status area, the process shifts to step S1709.

At step S1705, the process of displaying the status message is continued, and at step S1706, correspondingly to step S1705, control is provided such that the received message is not displayed on the top menu of the Web client. This control corresponds to a process executed by the image processing apparatus to transmit information required to cause the Web client's terminal device to display none of the message information, from the image processing apparatus to the terminal device via the predetermined communication line (LAN or the like). Alternatively, it is contemplated that when display information (for example, information required to display a menu such as one shown in FIG. 15) containing message information is transmitted from the image processing apparatus to the Web client's terminal device, flag information may be used to set the message information so as not to be displayed on the terminal device.

Furthermore, at step S1709, the message set, via the area 3204 in FIG. 14, to be displayed on the status area is displayed, and at step S1710, control is provided such that the received message is displayed on the top menu of the Web client. This control comprises generating information required to contain the message information in the information displayed on the top menu of the Web client.

On the other hand, at step S1703, if it is determined that the message received at step S1702 is to be displayed in the main display area (it has been input via the area 3205 in FIG. 14), then at step S1707, it is determined whether or not the message has been set to be always displayed (this corresponds to the setting 3206 provided on the menu in FIG. 14).

If it is determined that the message has been set by the manager's apparatus to be always displayed, then at step S1710, the received message is displayed in the main display area of the display unit of the image processing apparatus main body. Further, at step S1711, a control process is executed such that a message similar to the one displayed on the top menu of the Web client at step S1710 is displayed.

On the other hand, at step S1707, if it is determined that the message has not been set to be always displayed, then at step S1708, it is determined whether or not auto clear has been executed. If it is determined that the auto clear has been executed, the process shifts to step S1710. Since the processing at step 1710 is similar to that described previously, description thereof is omitted. On the other hand, if it is determined that the auto clear has not been executed at step S1708, the process shifts to step S1706 to repeat the process starting with step S1703.

In this manner, a display similar to the one on the display unit of the image processing apparatus main body is shown on the display unit of the Web client's terminal device, so that the Web client obtains the status information or the like on the image processing apparatus. If the status information is not required, that is, no status information is being displayed on the display unit of the image processing apparatus, the Web client can navigate through the message to more efficiently obtain the information, while the manager can more efficiently provide message information.

(Third Embodiment)

In the first embodiment, the timer having the well-known auto clear function (that resets the operation menu after it has not been manipulated for a fixed period of time) is set at step S609 to wait for a designated period of time until the display of the message is enabled. Further, in the second embodiment, as described at step S1708, the message is displayed on the display unit of the image processing apparatus or the Web client depending on whether or not the auto clear has been executed.

Some image processing apparatuses, however, have a function of setting the well-known auto clear function (that resets settings for sheet size or the like after it has not been manipulated for a fixed period of time) to be disabled. The auto clear function in the first embodiment is similar to that in the second embodiment, but the auto clear function as used herein refers to a process wherein if the sheet size, copy reduction rate, or the like for an image processing apparatus such as a copier is set differently from that for normal operation (default value), and when the operation unit has not been manipulated for a fixed period of time, the installed value (for example, sheet size, reduction rate, or the like) is automatically reset to the normal value (default value). If the image processing apparatus is set to prevent the auto clear function from being enabled, even if the manager, for example, sets the area 3206 shown in FIG. 14 so as to display the message with a timing for the auto clear operation as described above, the timing for displaying the message is actually not effected, thus preventing the message from being displayed. In this case, the process of disabling the auto clear function may be one of setting the fixed period time at an indefinite value at step S609 in FIG. 6. Alternatively, a process of determining whether or not the auto clear function has been set to be enabled may be inserted before step S609 so that the process shifts to step S609 if the auto clear function has been set to be enabled, whereas the step S603 and subsequent steps are repeated if it has been set to be disabled. If the message has been set, via the area 3206 in FIG. 14, to be displayed on the display section of the image processing apparatus main body when the auto clear function is executed, and if the auto clear function has been set to be disabled, for example, via the operation unit of the image processing apparatus main body, then the auto clear operation is not performed, thus preventing the message from being displayed.

In a third embodiment, a scheme will be described which efficiently allowing the user to know that the message cannot be displayed if the image processing apparatus main body has been set to prevent generation of a timing for displaying the message.

Figure 18:
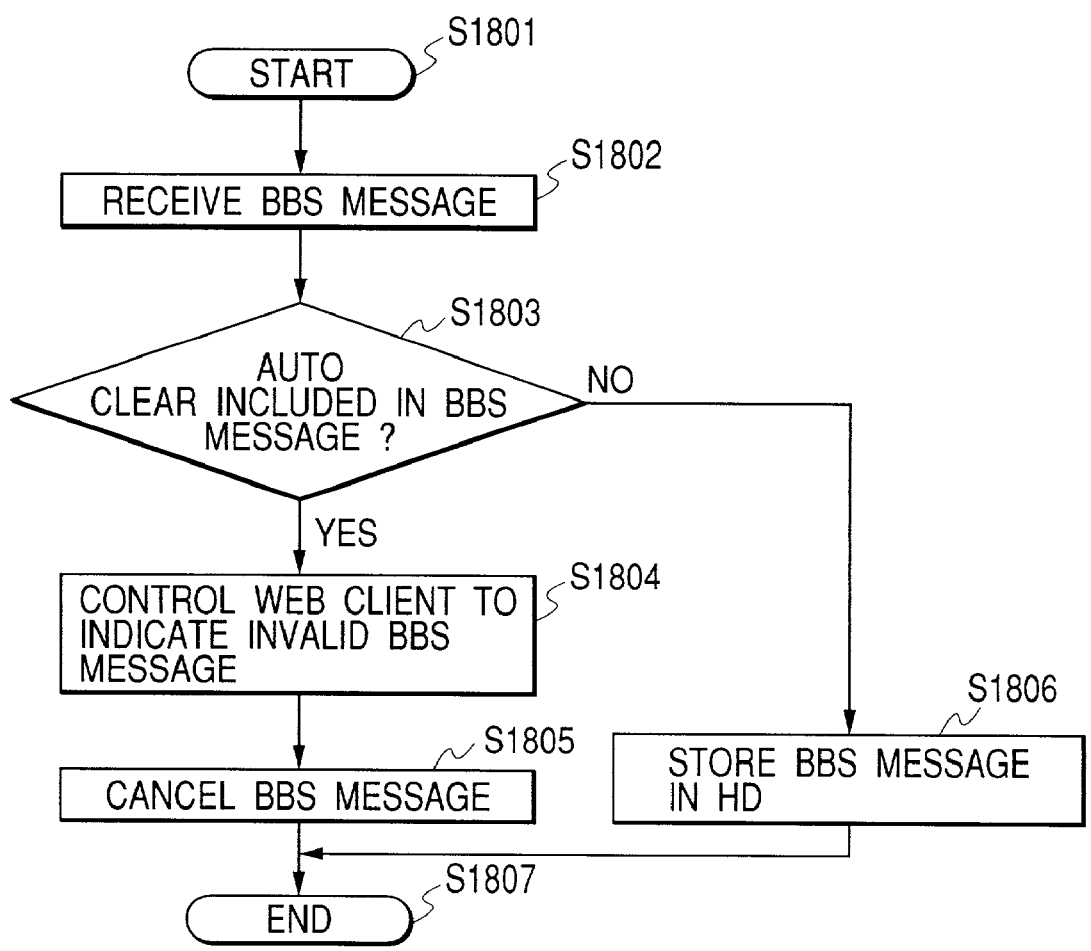
FIG. 18 is a flow chart showing a process executed by the image processing apparatus to display the message.

FIG. 18 shows a process executed by the image processing apparatus main body according to the present invention. The steps shown in the flow chart in FIG. 18 are carried out by the CPU (corresponding to the CPU In the drawings) provided in the apparatus, by loading program codes stored in the non-volatile storage (corresponding to the ROM or HDD in the drawings) and executing processes based on the loaded program codes. When the process shown in FIG. 18 is executed by the image processing apparatus, the image processing apparatus has been set to disable the above described auto clear process, via the operation unit (setting unit) provided in the image processing apparatus.

First, a message is set via the display unit of the manager's PC, that is, the areas 3204 and 3205 of the setting menu shown in FIG. 14. Then, at step 1802, the set message is received (input).

Then, at step S1803, it is determined whether or not the setting information in the received message information contains a setting for the auto clear function.

If it is determined at step S1803 that the auto clear setting is contained in the received message information, then at step 1804, control is provided such that a message indicating that BBS message data (message information) cannot be input is displayed on the display unit of the Web client (manager's PC). For example, if a message such as "Message Not Displayed Because Auto Clear Is Disabled" is displayed on the display unit of the Web client's terminal device, the manager, who has intended to display the message at the time of the auto clear operation, knows beforehand that the set message will not be displayed.

At step S1805, the message information transmitted from the Web client is cancelled (deleted).

Further, at step S1803, if the image processing apparatus has been set to disable the auto clear function, then at step S1806, the received message is saved to the non-volatile storage such as the hard disk.

Thus, with the process shown in FIG. 18, if the message setter intends to display the message at the time of the auto clear operation, he or she knows beforehand that the setting for the image processing apparatus are inappropriate for the setting for the message. That is, the image processing apparatus according to the present invention receives information on a message text and a setting for a timing for displaying the message, from an external apparatus, and uses the storage unit storing a predetermined setting (for example, a setting for disabling the auto clear function) for the image processing apparatus, to determine whether or not the timing setting information contained in the received message information is effective on the setting for the image processing apparatus currently stored in the storage unit, in order to issue an appropriate warning to the user. The term "effective" as used herein means that the setting currently provided in the image processing apparatus allow the message to be displayed at the time designated by the terminal device of the Web client or the like. For example, contradiction occurs if the message is to be displayed at the time of the auto clear operation even though this function has been set to be disabled. Furthermore, the process shown in FIG. 18 is executed through remote control provided by the terminal device connected to the image processing apparatus via the predetermined communication line (LAN or the like), the message setter at a remote site may know beforehand that the message setting is inappropriate.

Moreover, in another form of the process shown in FIG. 18, it is contemplated that this process may be replaced with one executed solely by the image processing apparatus. That is, if a message is set at the operation unit (corresponding to the operation unit in FIG. 4) of the image processing apparatus at step S1802, then it is determined whether or not message information has been input from the operation unit. Further, the processing at step S1803 is similar to that described above, and the processing at step S1804 can be replaced with display of a warning message on the operation unit. Furthermore, the processing at step 1806 is similar to that described above, so detailed description thereof is omitted.

Moreover, the timing designated by the user as one for displaying the message is not limited to the timing for the auto clear operation, and the process executed by the image processing apparatus is neither limited to the one concerning the auto clear operation. For example, it is contemplated that as the timing for displaying the message on the display unit of the image processing apparatus main body or on the display unit of the Web client's terminal device, the timing for reception of FAX information from an exterior apparatus may be set via a setting menu such as the one shown in FIG. 14. In this case, it is contemplated that if, for example, the FAX reception has been set to be inhibited, a message indicating that the message display is disabled is displayed on the display unit of the message setter. It is also contemplated that, for example, when message information containing a setting for displaying the message at a predetermined time is transmitted from the Web client's terminal device to the image processing apparatus, and if the image processing apparatus determines that the setting therefor is such that a main power supply is turned off in the designated predetermined time zone, then a process such as the display of a warning message is executed.

Further, in another form of the process shown in FIG. 18, it is contemplated that the relevant setting for the image processing apparatus is changed from "disable" to "enable" depending on the message setting specified by the user. It is contemplated that if, for example, the image processing apparatus has been set to disable the auto clear process (the auto clear process is not executed), the setting for the image processing apparatus may be changed so that the message is displayed when an external input that allows the message to be displayed at the time of the auto clear operation is provided to the image processing apparatus. In this case, it is contemplated that the warning at step S1804 in FIG. 18 may be replaced with the display of a warning message such as "Auto Clear Setting for Image Processing Apparatus Changed from Disable to Enable" on the message issuer (the operation unit of the image processing apparatus main body or the terminal device connected thereto via the predetermined communication line such as the LAN) and that the processing at step S1804 is replaced with the switching of the setting from "disable" to "enable". It is further contemplated that if the auto clear setting is changed from "disable" to "enable", the auto clear function may be enabled with its default value (for example, a setting provided at step S609 in FIG. 6 and which sets the fixed period of time at two minutes). In this case, the process for which the disabled setting is changed to the enabled setting is not limited to the auto clear operation, but may be, for example, the above described FAX operation.

Figure 19:
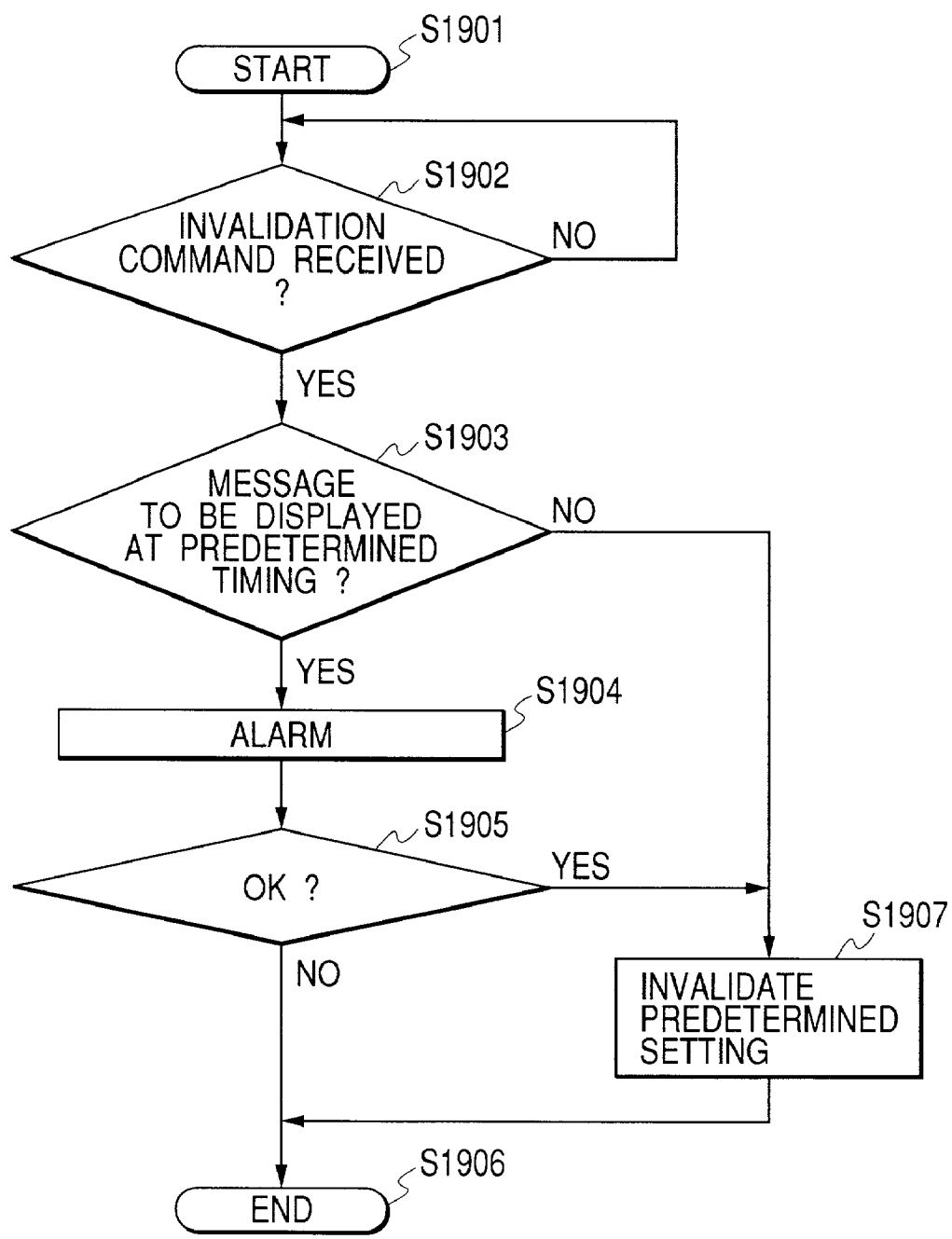
FIG. 19 is a flow chart showing a process executed by the image processing apparatus when setting information is input to the image processing apparatus.

Next, a description will be given with reference to FIG. 19, of a process executed by the image processing apparatus if the message is saved (stored) in the image processing apparatus with predetermined set conditions. The steps shown in the flow chart in FIG. 19 are carried out by the CPU (corresponding to the CPU in the drawings) provided in the apparatus, by loading program codes stored in the non-volatile storage (corresponding to the ROM or HDD in the drawings) and executing processes based on the loaded program codes.

At step S1902, it is determined whether or not an external input for disabling the setting for a predetermined process has been provided. For example, the input for disabling a predetermined process may include one for disabling the auto clear function or FAX reception. If the result of the determination at step S1902 is negative, a standby process is executed. If the result of the determination at step S1902 is affirmative, the process proceeds to step S1903. Further, the external input for disabling the predetermined process may include one corresponding to an operational instruction from the operation unit of the image processing apparatus main body or one of setting information transmitted from the data processing device (Web client's terminal device) connected to the image processing apparatus via the predetermined communication line such as the LAN.

At step S1903, it is determined whether or not the message stored in the HDD or the like (storage unit) of the image processing apparatus main body as described above contains such information as displayed with a predetermined timing. If, for example, the HDD contains such information as causes the message to be displayed at the time of the auto clear operation, the result of the determination at step S1903 is affirmative.

If the result of the determination at step S1903 is affirmative, then at step S1904, the image processing apparatus displays a warning message. Furthermore, if the setting is provided from the operation unit of the image processing apparatus at step S1902, the warning message is displayed on the operation unit. On the other hand, if the setting is provided from a terminal device externally connected to the image processing apparatus main body via the predetermined communication line such as the LAN, the warning message is displayed on a display unit of the external terminal device. The warning message may be, for example, "Message Display Will Be Disabled. OK?".

At step S1905, if the user understands the warning (the user understands that the message display will be disabled if the setting for the predetermined process is disabled), the process shifts to step S1907 to disable the predetermined setting. The disabled setting may be, for example, the auto clear function. Of course, it is not limited to this function.

On the other hand, if the result of the determination at step S1903 is negative, the process shifts to step S1907 to disable the predetermined setting (process) for the image processing apparatus, and is then completed. This means that the image processing apparatus has determined that even if the setting for the predetermined process executed by the image processing apparatus is disabled, the setting for the message display is not affected.

Consequently, the process executed by the image processing apparatus as shown in FIG. 19 prevents a situation where the message already set and stored in the image processing apparatus main body fails to be displayed because the user instructs the setting (for example, the auto clear setting) for the predetermined process executed by the image processing apparatus to be disabled.

(Other Embodiments)

The present invention is applicable to a system composed of plural pieces of equipment (for example, a host computer, an interface device, a reader, and a printer) or an apparatus (for example, a copier or facsimile terminal equipment) comprised of one piece of equipment.

The object of the present invention may also be realized by supplying a device or a personal computer as an execution subject with a storage medium (or recording medium) storing program codes for the procedures shown in the flow charts, for each of a device module, a user module, and a service module depending on the execution subject, and causing the device or personal computer (or CPU or MPU) to read out and execute program codes stored in the storage medium.

In this case, the program code themselves read out from the storage medium realize the above described functions of the present embodiments, so that the storage medium storing the program codes or the program itself also constitutes the present invention.

It is to be understood that the functions of the above described embodiments can be realized not only by executing program codes read out by a computer, but also by causing an operating system (OS) that operates on the computer to perform part or all of the actual process in accordance with instructions expressed by the program codes.

Furthermore, the program codes read out from the storage medium may be written into a memory provided in an expanded board inserted into the computer, or an expanded unit connected to the computer, and a CPU or the like provided in the expanded board or expanded unit may perform part or all of the actual process in accordance with the instructions expressed by the program codes, so as to accomplish the functions of the above described embodiments.

As described above, according to the present invention, desired information can be effectively and efficiently communicated to the users. At this time, the burdens on the manager can also be reduced.

The apparatus manager can display a message in a desired one of the different display areas of the display device of the printing apparatus. Accordingly, messages can be flexibly provided for the users by using the different display areas for the respective messages.

Since the messages can be displayed in the different display areas of the display device with different timings and different amounts of information, they can be effectively and efficiently displayed.

Since the apparatus manager can determine and show whether or not the message can be deleted, the message can be displayed depending on its urgency and importance. Furthermore, the use of the printing apparatus can be limited if the operation menu for the printing apparatus is not displayed simultaneously with the message.

Since the Web client externally connected to the printing apparatus can check messages from the apparatus manger via the screen of his or her own personal computer without visiting the installation site of the printing apparatus, the users can operate more efficiently.

When a message to be displayed on the display unit provided in the image processing apparatus or on the display unit of the Web client's terminal device is to be set in the image processing apparatus, and if the setting for a display timing (for example, display upon auto clear) contained in the message is inappropriate for the relevant setting (for example, a setting for disabling the auto clear function) for the image processing apparatus, the message setter (manager) knows this beforehand.

Since the present invention provides the scheme in which the setting for the image processing apparatus can be automatically or semi-automatically (via the user's understanding and instruction) changed so as to be suited for the display of a message, the message provider (manager) can set the message smoothly.

What is claimed is:

1. A printing apparatus having a printing function and a scanning function, said printing apparatus comprising:
   an execution unit, adapted to execute a print job or a scan job;
   an operation unit, adapted to display an operation screen for allowing a user to operate said printing apparatus by entering a key on the operation screen; and
   a storage unit, adapted to store client display data for causing a browser provided in a Web client to form an input column for a character message,
   wherein said printing apparatus can be accessed by external apparatuses and said printing apparatus further comprises (a) a transmission unit, adapted to transmit to one of the external apparatuses that serves as a Web client the client display data stored in said storage unit for use in a client display screen in which a character message to be displayed is input, (b) a reception unit, adapted to receive (i) message data based on a character message input by the Web client via the client display screen displayed on the basis of the client display data transmitted by said transmission unit and (ii) timing information input by the Web client via the client display screen displayed on the basis of the client display data transmitted by said transmission unit, and
   wherein said operation unit displays a message formed based on the message data received by said reception unit, in accordance with the timing information.

2. A printing apparatus according to claim 1, wherein said operation unit is adapted to display different display areas including a first display area and a second display area, and
   wherein said transmission unit transmits the client display data stored in said storage unit to the Web client for causing the browser provided in the Web client to form respective different input columns for character messages corresponding to the first and second display areas.

3. A printing apparatus according to claim 1, wherein said transmission unit transmits the client display data including the message formed based on the message data received by said reception unit, to another external apparatus that serves as another Web client, and
   wherein the client display data transmitted to the another Web client is read by a browser provided in the another Web client.

4. A printing apparatus according to claim 1, wherein the timing information specifies displaying the message in response to said execution unit being in a standby state.

5. A control method for a printing apparatus (1) comprising (a) an operation unit, adapted to display an operation screen for allowing a user to operate the printing apparatus by entering a key on the operation screen, and (b) a storage unit, wherein the printing apparatus can be accessed by external apparatuses, and (2) having a printing function and a scanning function, comprising:

executing a print job or a scan job;

transmitting, from the printing apparatus, to an external apparatus that serves as a Web client display data stored in the storage unit for causing a browser provided in the Web client to form an input column for a character message and for use in a client display screen in which a character message to be displayed is input;

receiving, by the printing apparatus, (i) message data based on a character message input by the Web client via the client display screen displayed on the basis of the transmitted client display data and (ii) timing information input by the Web client via the client display screen displayed on the basis of the transmitted client display data, wherein the operation unit displays a message formed based on the received message data, in accordance with the timing information.

6. The control method for the printing apparatus according to claim 5, wherein said operation unit is adapted to display different display areas including a first display area and a second display area, and wherein the client display data stored in said storage unit is transmitted to the Web client to cause the browser provided in the Web client to form respective different input columns for character messages corresponding to the first and second display areas.

7. The control method for the printing apparatus according to claim 5, wherein the client display data including the message formed based on the message data received by said reception unit, is transmitted to another external apparatus that serves as another Web client, and wherein the client display data transmitted to another Web client is read by a browser provided in the another Web client.

* * * * *

UNITED STATES PATENT AND TRADEMARK OFFICE
CERTIFICATE OF CORRECTION

| | |
|---|---|
| PATENT NO. | : 7,330,280 B2 |
| APPLICATION NO. | : 09/878305 |
| DATED | : February 12, 2008 |
| INVENTOR(S) | : Toshiya Kanazawa |

It is certified that error appears in the above-identified patent and that said Letters Patent is hereby corrected as shown below:

COLUMN 1
Line 14, "executes" should read --execute--.

COLUMN 2
Line 19, "massage" should read --message--.
Line 31, "corresponding" should read --corresponding to--.

COLUMN 4
Line 3, "bus" should read --bus 15--.

COLUMN 10
Line 5, "manger" should read --manager--.

COLUMN 11
Line 55, "descried" should read --described--.

COLUMN 13
Line 21, "1710" should read --S1710--.

COLUMN 14
Line 23, "In" should read --in--.
Line 41, "1804," should read --S1804,--.

COLUMN 15
Line 26, "1806" should read --S1806--.

UNITED STATES PATENT AND TRADEMARK OFFICE
CERTIFICATE OF CORRECTION

PATENT NO. : 7,330,280 B2
APPLICATION NO. : 09/878305
DATED : February 12, 2008
INVENTOR(S) : Toshiya Kanazawa It is certified that error appears in the above-identified patent and that said Letters Patent is hereby corrected as shown below:

COLUMN 18
Line 2, "manger" should read --manager--.

Signed and Sealed this

Thirty-first Day of March, 2009

JOHN DOLL
*Acting Director of the United States Patent and Trademark Office*